United States Patent
Nakane

(10) Patent No.: US 9,066,076 B2
(45) Date of Patent: Jun. 23, 2015

(54) VIDEO DISPLAY CONTROL METHOD AND APPARATUS

(75) Inventor: Kazuhiko Nakane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 684 days.

(21) Appl. No.: 12/915,167

(22) Filed: Oct. 29, 2010

(65) Prior Publication Data

US 2011/0102559 A1 May 5, 2011

Related U.S. Application Data

(60) Provisional application No. 61/256,682, filed on Oct. 30, 2009.

(30) Foreign Application Priority Data

Aug. 4, 2010 (JP) ................................. 2010-175228

(51) Int. Cl.
*H04N 13/02* (2006.01)
*H04N 13/00* (2006.01)
*H04N 13/04* (2006.01)

(52) U.S. Cl.
CPC ....... *H04N 13/0029* (2013.01); *H04N 13/0022* (2013.01); *H04N 13/007* (2013.01); *H04N 13/04* (2013.01)

(58) Field of Classification Search
CPC ........................ H04N 13/0048; H04N 13/0011
USPC ...................................... 348/E15.001, 43, 51
See application file for complete search history.

(56) References Cited

U.S. PATENT DOCUMENTS

| | | | |
|---|---|---|---|
| 5,574,836 A * | 11/1996 | Broemmelsiek | 345/427 |
| 5,859,626 A * | 1/1999 | Kawamura | 345/99 |
| 6,177,952 B1 * | 1/2001 | Tabata et al. | 348/47 |
| 6,285,402 B1 * | 9/2001 | Miyazaki et al. | 348/445 |
| 6,765,568 B2 * | 7/2004 | Swift et al. | 345/419 |
| 7,298,393 B2 * | 11/2007 | Morita | 348/51 |
| 7,417,664 B2 | 8/2008 | Tomita | |
| 7,679,641 B2 * | 3/2010 | Lipton et al. | 348/51 |
| 8,035,683 B2 * | 10/2011 | Kitaura et al. | 348/51 |
| 8,400,370 B2 * | 3/2013 | Yoshida et al. | 345/1.3 |
| 2001/0015753 A1 * | 8/2001 | Myers | 348/51 |

(Continued)

FOREIGN PATENT DOCUMENTS

| | | |
|---|---|---|
| JP | 9-261691 A | 10/1997 |
| JP | 9-271043 A | 10/1997 |

(Continued)

*Primary Examiner* — Sath V Perungavoor
*Assistant Examiner* — Clifford Hilaire
(74) *Attorney, Agent, or Firm* — Birch, Stewart, Kolasch & Birch, LLP

(57) ABSTRACT

Stereoscopic video content is reproduced to obtain a first pair of images with mutual parallax producing a stereoscopic effect. A first stereoscopic adjustment on the first pair of images is carried out to obtain a second pair of images. A second stereoscopic adjustment on the second pair of images is carried out to obtain a third pair of images, which are displayed on a screen to respective eyes of the viewer. The first stereoscopic adjustment is carried out differently for different video sources. The second stereoscopic adjustment is the same for all sources. The combination of the first and second stereoscopic adjustments enables content from different sources to be displayed with an appropriate stereoscopic adjustment for each source.

13 Claims, 15 Drawing Sheets

(56) References Cited

U.S. PATENT DOCUMENTS

| | | | |
|---|---|---|---|
| 2001/0045951 A1* | 11/2001 | Allen | 345/419 |
| 2003/0113012 A1* | 6/2003 | Yoon | 382/154 |
| 2003/0152264 A1* | 8/2003 | Perkins | 382/154 |
| 2004/0233275 A1* | 11/2004 | Tomita | 348/51 |
| 2005/0078108 A1* | 4/2005 | Swift et al. | 345/419 |
| 2005/0089212 A1* | 4/2005 | Mashitani et al. | 382/154 |
| 2006/0077545 A1* | 4/2006 | Cobb et al. | 359/464 |
| 2006/0168859 A1* | 8/2006 | Pombo et al. | 40/611.07 |
| 2006/0203085 A1* | 9/2006 | Tomita | 348/51 |
| 2006/0209183 A1* | 9/2006 | Mashitani et al. | 348/51 |
| 2006/0290778 A1* | 12/2006 | Kitaura et al. | 348/51 |
| 2007/0052729 A1* | 3/2007 | Fukushima et al. | 345/629 |
| 2007/0058034 A1* | 3/2007 | Numazaki et al. | 348/51 |
| 2007/0285663 A1* | 12/2007 | Hewitt et al. | 356/399 |
| 2010/0074594 A1* | 3/2010 | Nakamura et al. | 386/92 |
| 2010/0142924 A1* | 6/2010 | Yamashita et al. | 386/95 |

FOREIGN PATENT DOCUMENTS

| | | |
|---|---|---|
| JP | 2004-180069 A | 6/2004 |
| KR | 10-2009-0059380 A | 6/2009 |
| WO | WO 2004/084560 A1 | 9/2004 |

\* cited by examiner

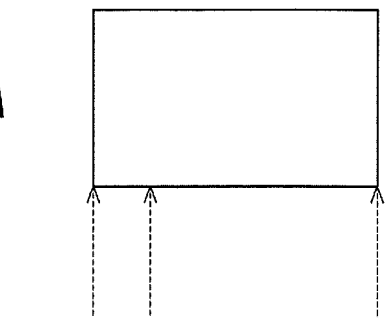
FIG.3A
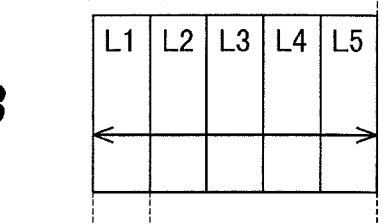
FIG.3B
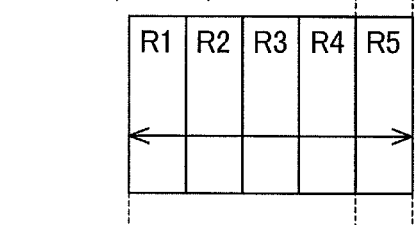
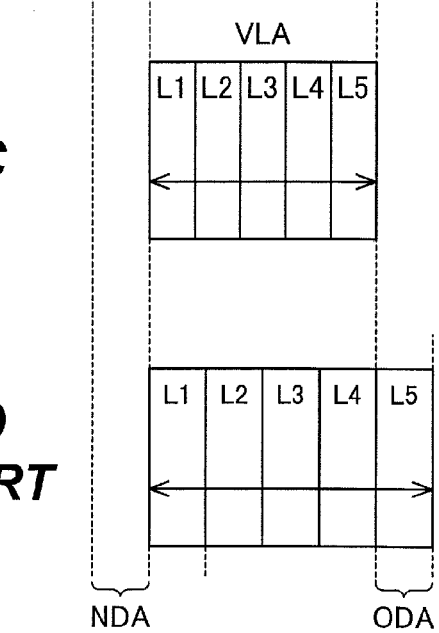
FIG.3C
FIG.3D
PRIOR ART
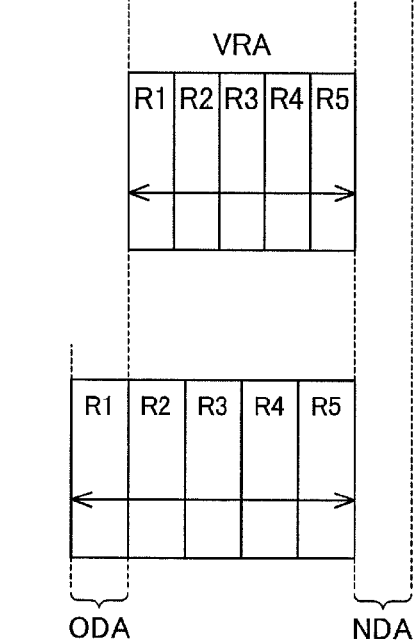

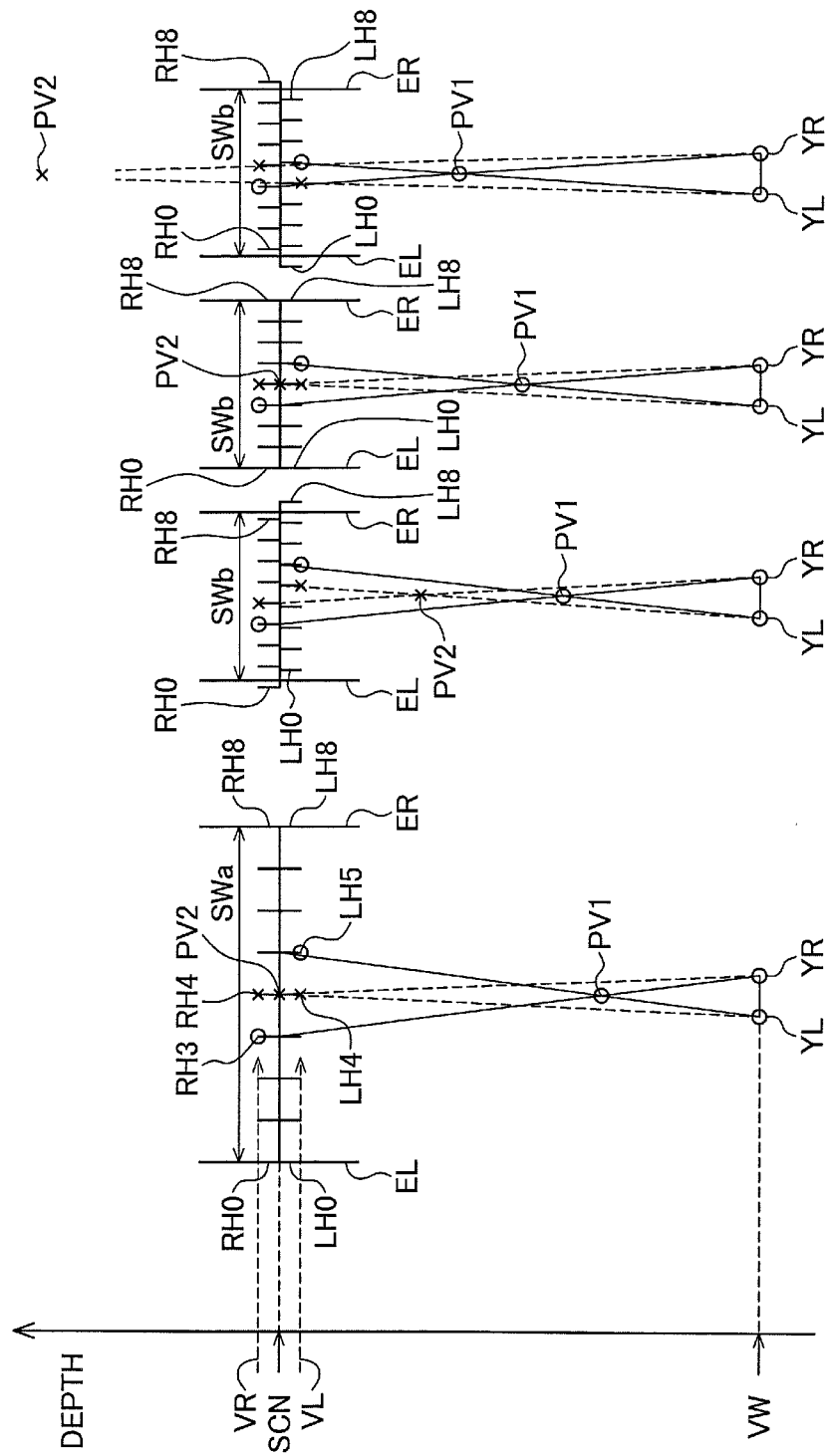

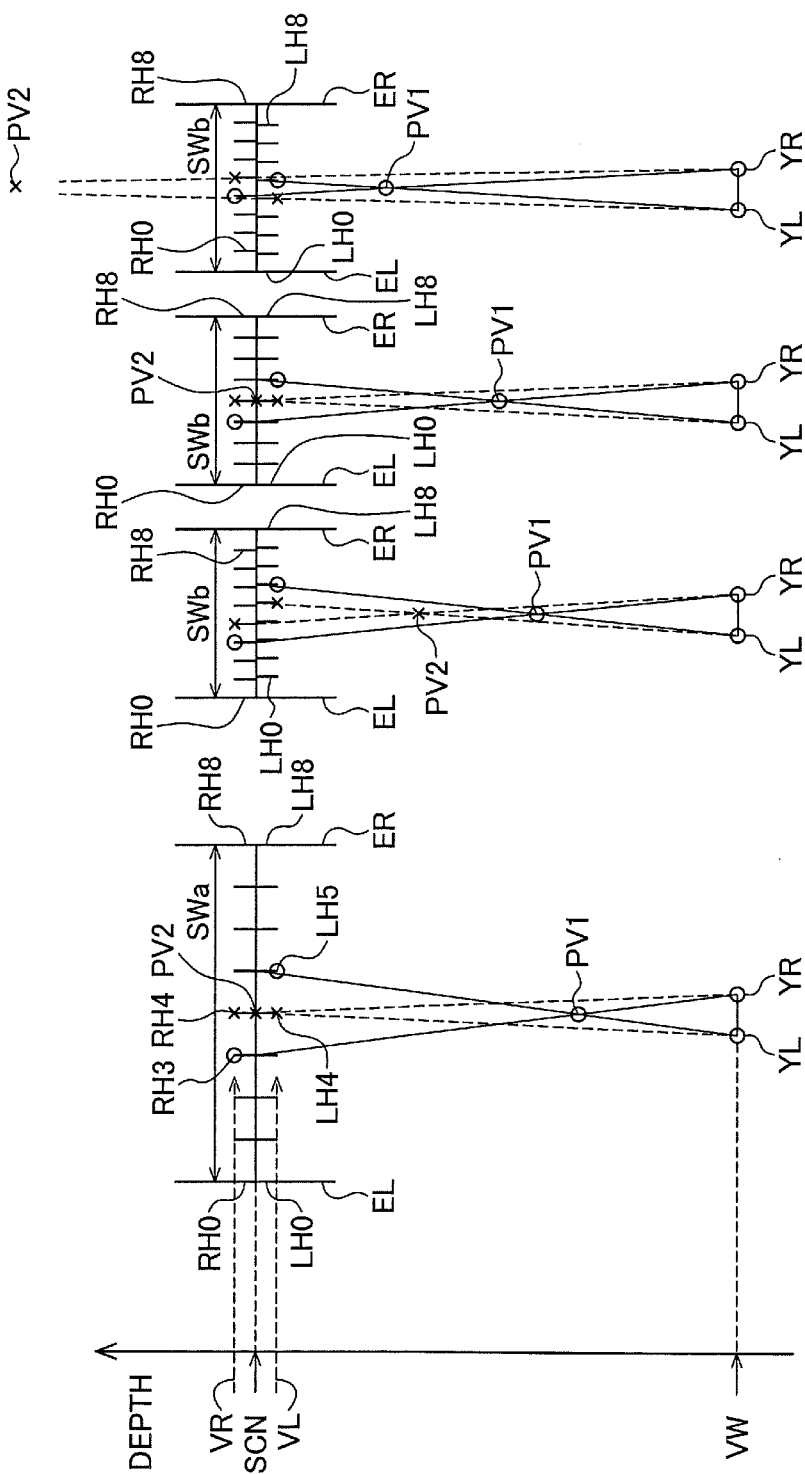

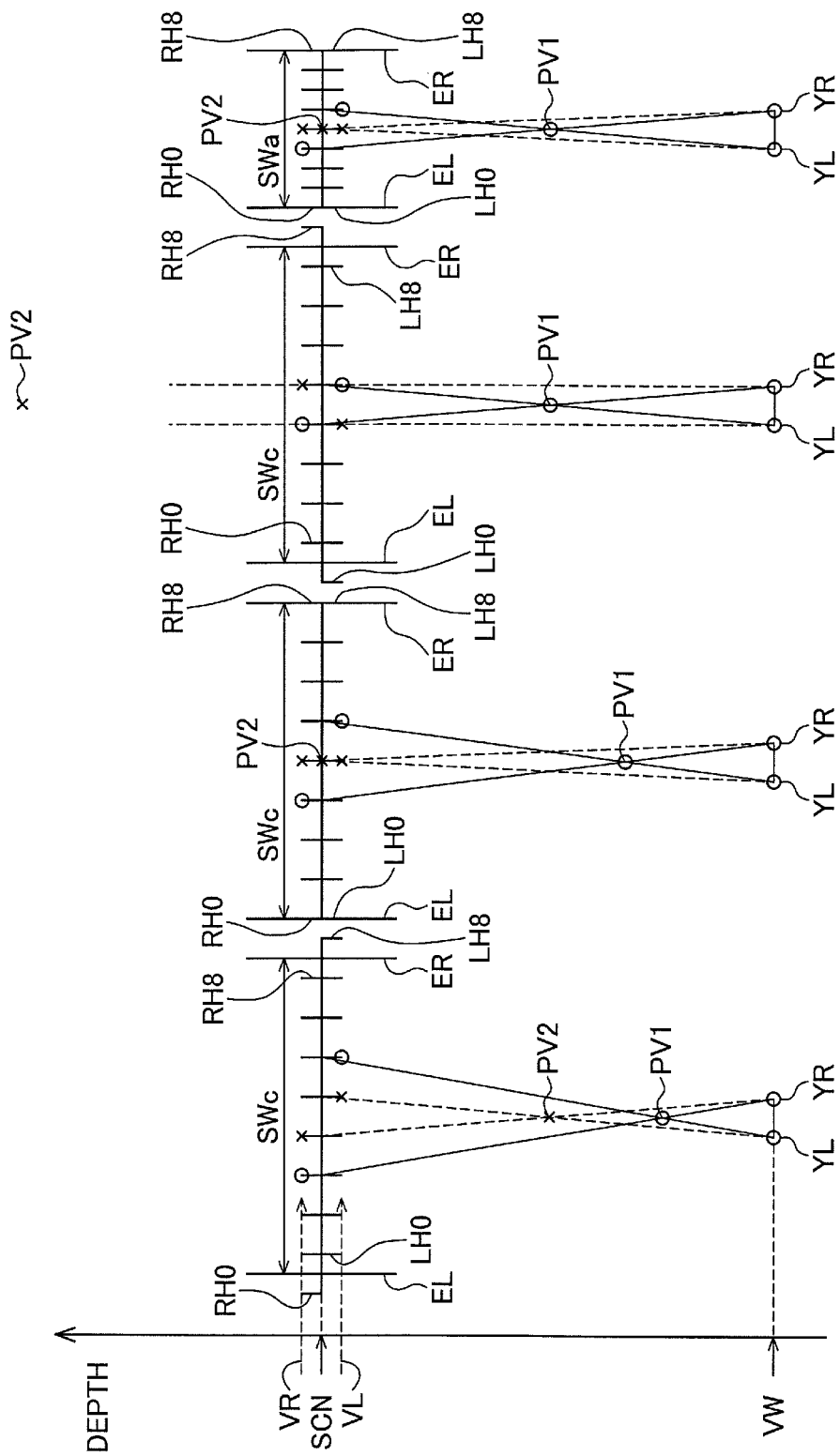

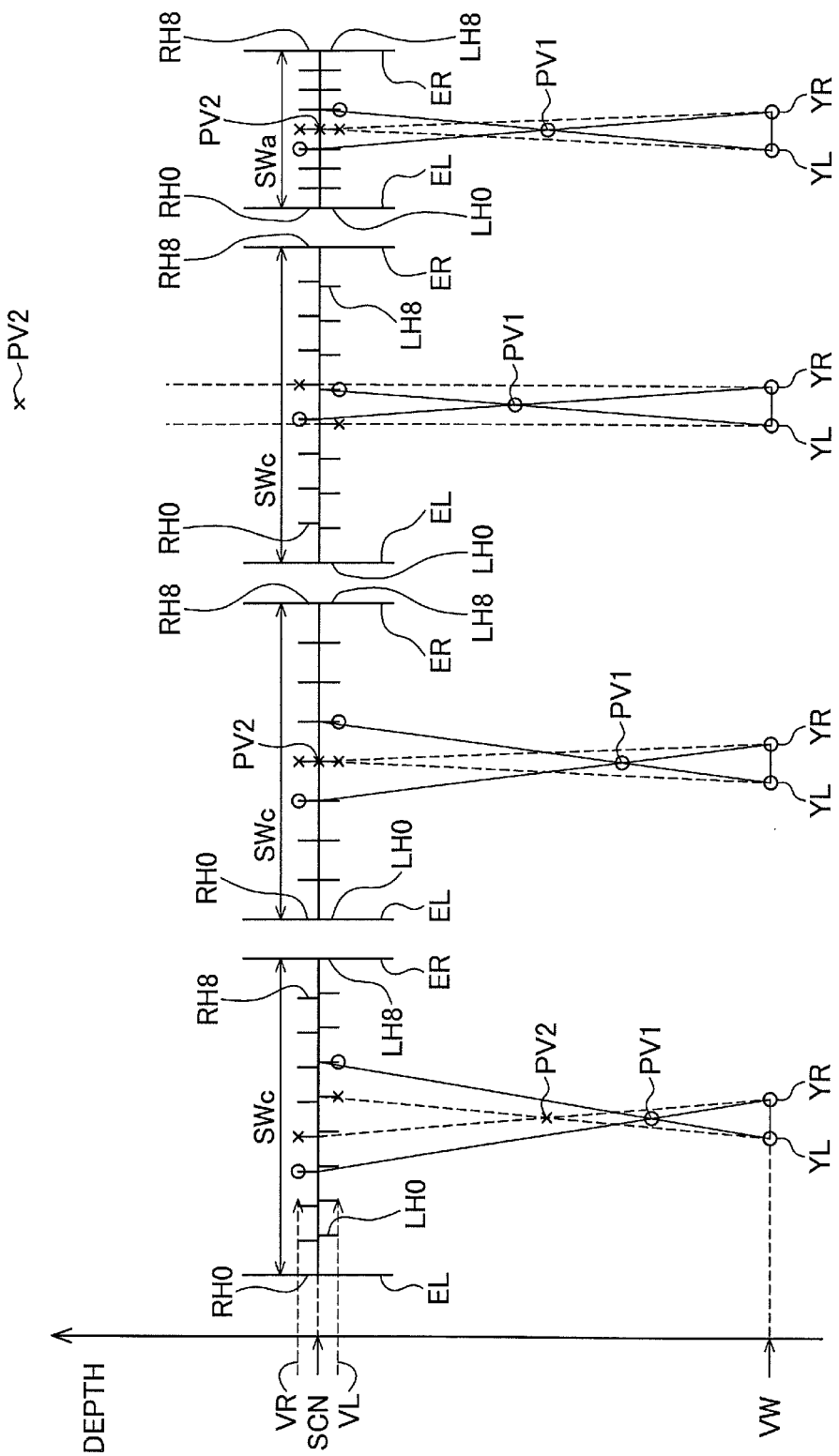

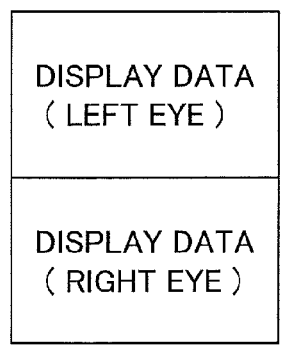
FIG.9A
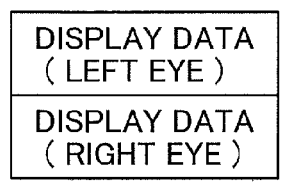
FIG.9B
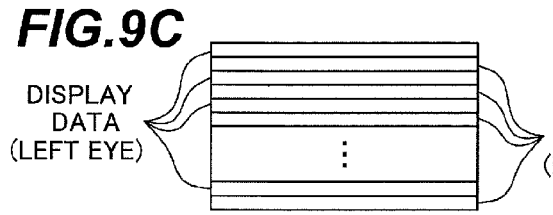
FIG.9C
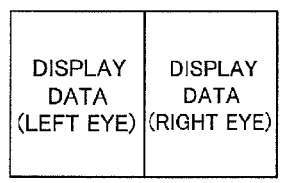
FIG.9D
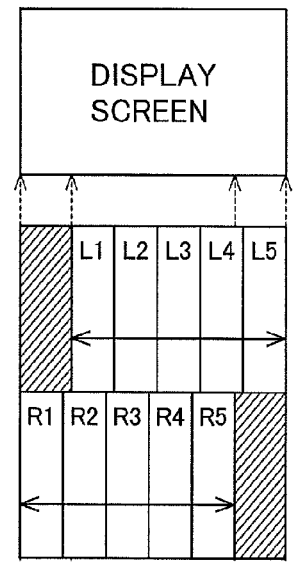
FIG.9E
FIG.9F
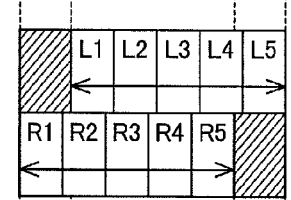
FIG.9G
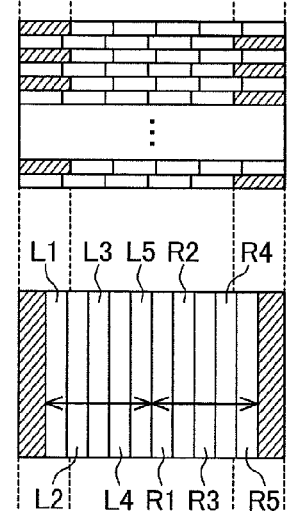
FIG.9H
FIG.9I

FIG.12

| b7 | b6 | b5 | b4 | b3 | b2 | b1 | b0 |
|----|----|----|----|----|----|----|----|
|    |    |    |    |    |    |    |    |

| ds | sa |
|----|-----|

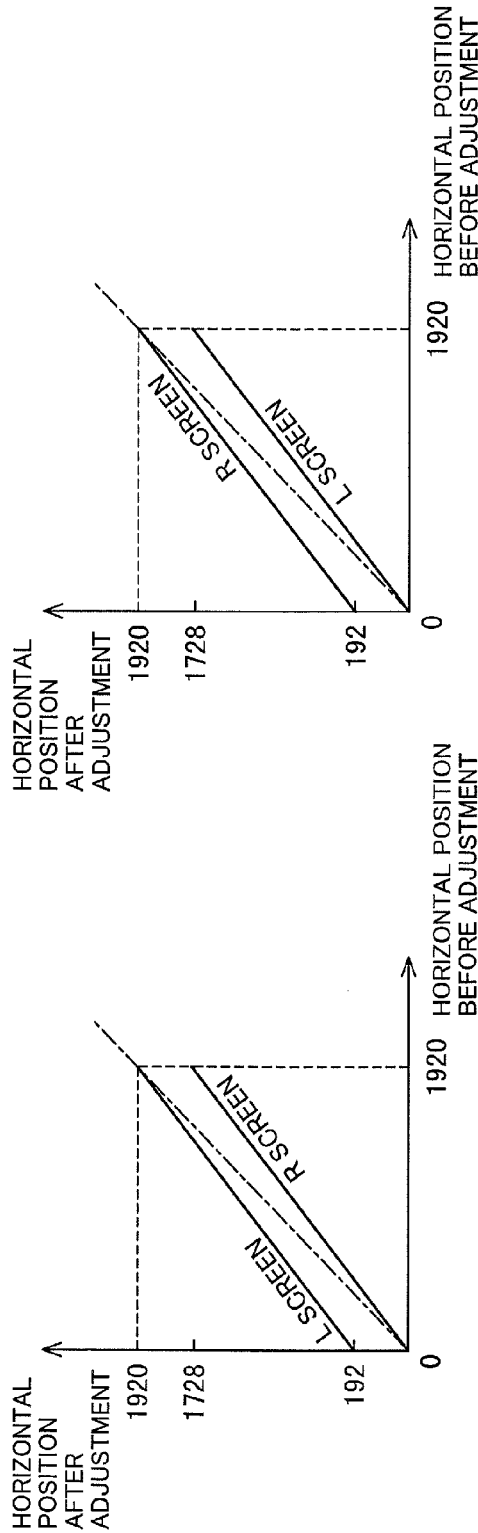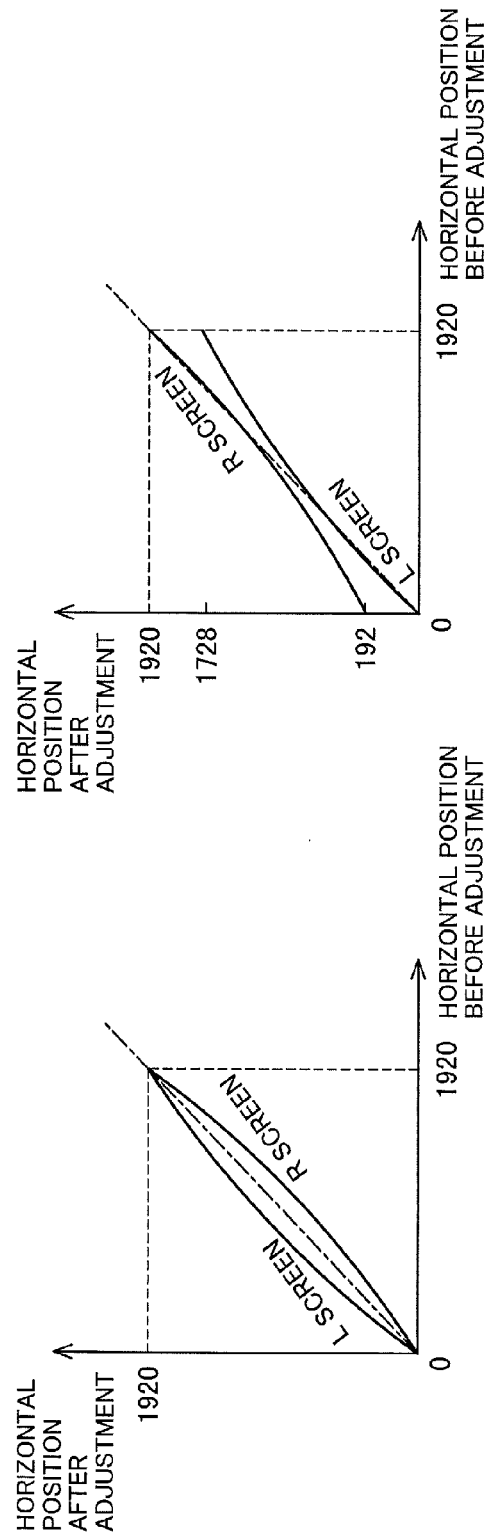

VIDEO DISPLAY CONTROL METHOD AND APPARATUS

CROSS REFERENCE TO RELATED APPLICATIONS

This nonprovisional application claims the benefit under 35 U.S.C §119(e) of U.S. Provisional Application No. 61/256,682 filed on Oct. 30, 2009, and under 35 U.S.C §119 (a) to Patent Application No. 2010-175228 filed in Japan, on Aug. 4, 2010. The entire contents of all of the above applications are hereby incorporated by reference into the present application.

BACKGROUND OF THE INVENTION

1. Field of the Invention

The present invention relates to a stereoscopic video display control method and control apparatus, more particularly to a method and apparatus for adjusting stereoscopic effects.

2. Description of the Related Art

Three-dimensional video (3D content), which creates a stereoscopic view by displaying separate images for the left and right eyes, is coming into widespread use. When 3D content is created, it is generally adjusted to provide the best stereoscopic view in an assumed viewing environment with standard viewing conditions such as the size of the display screen, the distance from the screen to the viewer, the separation between the viewer's pupils, and the desired stereoscopic depth.

However, individual users' viewing environments tend to vary, and if they depart from the envisioned standard conditions, the stereoscopic effect is degraded. This situation is often encountered in practice. For example, a display screen larger than the standard size creates an exaggerated sense of depth, making the viewer uncomfortable, whereas a screen smaller than the standard size fails to provide sufficient sense of depth. Too short a viewing distance also gives an uncomfortably exaggerated sense of depth, while too long a viewing distance fails to provide sufficient sense of depth.

Individual differences in pupil-to-pupil distance can also produce differences in stereoscopic perception. In addition, people differ in the degree of stereoscopic effect with which they feel comfortable, and in the rapidity with which they tire from continuous stereoscopic viewing. Methods of adjusting stereoscopic effects have therefore been developed and disclosed.

In International Published Patent Application No. WO 2004/084560, Tomita proposes a stereoscopic video photographing and displaying system in which right-eye and left-eye video images are captured by a stereoscopic video imaging unit, transferred via a medium to a stereoscopic video display unit, and displayed. The stereoscopic video imaging unit measures the distance to the subject and sends distance information via the medium together with the video information. The stereoscopic video display unit has an offset setting means that displays the right-eye and left-eye images with different offsets depending on the received distance information and the size of the displayed image.

In Japanese Patent Application Publication No. 2004-180069, Tomita discloses a three-dimensional video displaying device that shifts the right-eye and left-eye images according to information concerning both the stereoscopic video image and the stereoscopic video display device, thereby adjusting the stereoscopic effect of the displayed image.

In Japanese Patent Application Publication No. H09-261691, Tateno discloses a video display system that shifts the display positions of right-eye and left-eye images in the right and left directions by a prescribed distance and displays the shifted images on the screen of a display device that guides the right-eye video image to the viewer's right eye and guides the left-eye video image to the viewer's left eye, thereby generating a virtual image at a distance behind the screen.

In Japanese Patent Application Publication No. H09-271043, Tabata discloses a stereoscopic image display device that reads the parallax of a pair of images displayed separately to the left and right eyes from their separate video signals and varies the effective binocular parallax by horizontally shifting the right-eye and left-eye images according to the instantaneous parallax value.

By horizontally shifting the right-eye and left-eye video images, the conventional art in these disclosures enables adjustment of stereoscopic effects, but with the disadvantage that the left-eye and right-eye video images may be partially shifted off the screen of the display device and lost.

3D content data can be generally classified as 3D broadcast programs supplied via television broadcasts and 3D disc titles supplied on recording media such as Blu-ray discs. 3D broadcast programs are received by a device such as a tuner or set-top box that reconstructs the 3D video signal from the received signal or data and sends the 3D video signal to the 3D display device. 3D disc titles are reproduced by a device, such as a Blu-ray player or a personal computer, that likewise reconstructs the 3D video signal and sends the 3D video signal to the 3D display device. The 3D display device may accordingly be used in combination with either a receiving device or a reproducing device, or with both. The stereoscopic effect then needs to be adjusted across the combination as a whole, but appropriate means for this purpose have been lacking.

SUMMARY OF THE INVENTION

An object of the present invention is to provide appropriate stereoscopic adjustments for content reproduced from different sources but displayed by a single display device.

Another object of the invention is to perform stereoscopic adjustments without loss of data.

According to one aspect of the invention, there is provided a video display control method comprising the steps of:

reproducing, by means of a stereoscopic video content reproducing device, stereoscopic video content to obtain a first pair of images with mutual parallax;

performing, by means of the stereoscopic video content reproducing device, a first stereoscopic adjustment that modifies the first pair of images, thereby obtaining a second pair of images;

inputting the second pair of images to a stereoscopic video display device having a screen;

performing, by means of the stereoscopic video display device, a second stereoscopic adjustment, coordinated with the first stereoscopic adjustment, that modifies the second pair of images, thereby obtaining a third pair of images; and displaying the third pair of images on the screen to respective eyes of a viewer.

According to another aspect of the invention, there is provided a video display control apparatus comprising:

a stereoscopic video content reproducing device for reproducing stereoscopic video content to obtain a first pair of images with mutual parallax, the stereoscopic video content reproducing device including a first stereoscopic adjuster for performing a first stereoscopic adjustment that modifies the first pair of images thereby obtaining a second pair of images; and a stereoscopic video display device that receives the second pair of images, the stereoscopic video display device including a second stereoscopic adjuster that, operating in coordination with the first stereoscopic adjuster, performs a second stereoscopic adjustment that modifies the second pair of images, thereby obtaining a third pair of images, the stereoscopic video display device displaying the third pair of images on a screen to respective eyes of a viewer.

The first stereoscopic adjustment may include modifying the first pair of images by horizontal scaling of both of the first pair of images and horizontal shifting of at least one of the first pair of images to align a left edge of one of the resulting second pair of images with a left edge of the screen and align a right edge of another one of the resulting second pair of images with a right edge of the screen; and the second stereoscopic adjustment may include modifying the second pair of images by horizontal scaling of both of the second pair of images and horizontal shifting of at least one of the second pair of images to align a left edge of one of the resulting third pair of images with a left edge of the screen and align a right edge of another one of the resulting third pair of images with a right edge of the screen.

The scaling factor for the horizontal scaling and the shift width for the horizontal shift may be transmitted from the outside of the device performing the image display control, or may be stored in the device.

The device performing the image display control may be capable of transmitting the scaling factor or the shift width to the outside of the device.

The scaling factor or the shift width may be set after being calculated from the scaling factor or the shift width stored within the device and the scaling factor or the shift width supplied from the outside of the device.

According to another aspect of the invention, there is provided a video display control method for use in a video reproducing and displaying method comprising the steps of:

inputting a pair of images with mutual parallax, that has been obtained by reproducing a stereoscopic video content, and displaying the pair of different images with mutual parallax on a screen to respective eyes of a viewer;

said video display control method comprising:
modifying the pair of images by
horizontally scaling both of the pair of images, and
horizontally shifting at least one of the pair of images to align a left edge of one of the modified pair of images with a left edge of the screen and align a right edge of another one of the modified pair of images with a right edge of the screen; and displaying the modified pair of images.

According to a further aspect of the invention, there is provided a video display control apparatus for use in a system in which a pair of images with mutual parallax are input from a stereoscopic video content reproducing device that reproduces stereoscopic video content, to a stereoscopic video display device with a screen, wherein the pair of different images with mutual parallax are displayed on the screen, so that the pair of different images with parallax are seen by respective eyes of a viewer, the video display control apparatus comprising:

a scaler that scales both of the pair of images in a horizontal direction; and a shifter that shifts at least one of the pair of images horizontally so that, as a result of the scaling and shifting, a left edge of one of the pair of images is aligned with a left edge of the screen and a right edge of another one of the pair of images is aligned with a right edge of the screen.

The invention enables stereoscopic video content from different sources to be displayed on the same screen with different stereoscopic adjustments for the different sources. The adjustment settings can be stored and switched to provide optimal stereoscopic effects for different content or different viewers.

By carrying out each stereoscopic adjustment by a combination of horizontal scaling and shifting, the invention can avoid the loss of any part of the displayed images.

The adjustments can be controlled efficiently by specifying just a few settings, such as a scaling factor and shift width for each adjustment.

BRIEF DESCRIPTION OF THE DRAWINGS

In the attached drawings:

FIG. 3A illustrates the display screen of the 3D display device in FIG. 1;

FIG. 3B shows unadjusted left-eye and right-eye image data;

FIG. 3C shows an exemplary novel adjustment of the left-eye and right-eye image data;

FIG. 3D shows the corresponding conventional adjustment of the left-eye and right-eye image data;

FIG. 5A illustrates the stereoscopic display of 3D content on a screen of standard size;

FIG. 5B illustrates the stereoscopic display of the same 3D content on a screen of half the standard size with a conventional stereoscopic adjustment;

FIG. 5C illustrates the stereoscopic display of the same 3D content on a screen of half the standard size without stereoscopic adjustment;

FIG. 5D illustrates the stereoscopic display of the same 3D content on a screen of half the standard size with another conventional stereoscopic adjustment;

FIG. 6A illustrates the stereoscopic display of 3D content on a screen of standard size;

FIG. 6B illustrates the stereoscopic display of the same 3D content on a screen of half the standard size with a novel stereoscopic adjustment;

FIG. 6C illustrates the stereoscopic display of the same 3D content on a screen of half the standard size without stereoscopic adjustment;

FIG. 6D illustrates the stereoscopic display of the same 3D content on a screen of half the standard size with another novel stereoscopic adjustment;

FIG. 7A illustrates the stereoscopic display of 3D content on a screen of twice the standard size with a conventional stereoscopic adjustment;

FIG. 7B illustrates the stereoscopic display of the same 3D content on a screen of twice the standard size without stereoscopic adjustment;

FIG. 7C illustrates the stereoscopic display of the same 3D content on a screen of twice the standard size with another conventional stereoscopic adjustment;

FIG. 7D illustrates the stereoscopic display of stereoscopic display of the same 3D content on a screen of standard size;

FIG. 8A illustrates the stereoscopic display of 3D content on a screen of twice the standard size with a novel stereoscopic adjustment;

FIG. 8B illustrates the stereoscopic display of the same 3D content on a screen of twice the standard size without stereoscopic adjustment;

FIG. 8C illustrates the stereoscopic display of the same 3D content on a screen of twice the standard size with another novel stereoscopic adjustment;

FIG. 8D illustrates the stereoscopic display of the same 3D content on a screen of standard size;

FIGS. 9A to 9D illustrate four 3D data formats;

FIG. 9E illustrates the display screen of the 3D display device in FIG. 1;

FIGS. 9F to 9I illustrate novel stereoscopic adjustments on data in the formats in FIGS. 9A to 9D;

FIG. 12 illustrates a data format for parameters describing the novel stereoscopic adjustments in FIGS. 10 and 11;

FIGS. 14A to 14D illustrate novel stereoscopic adjustments performed in a third embodiment of the invention;

DETAILED DESCRIPTION OF THE INVENTION

Figure 1:
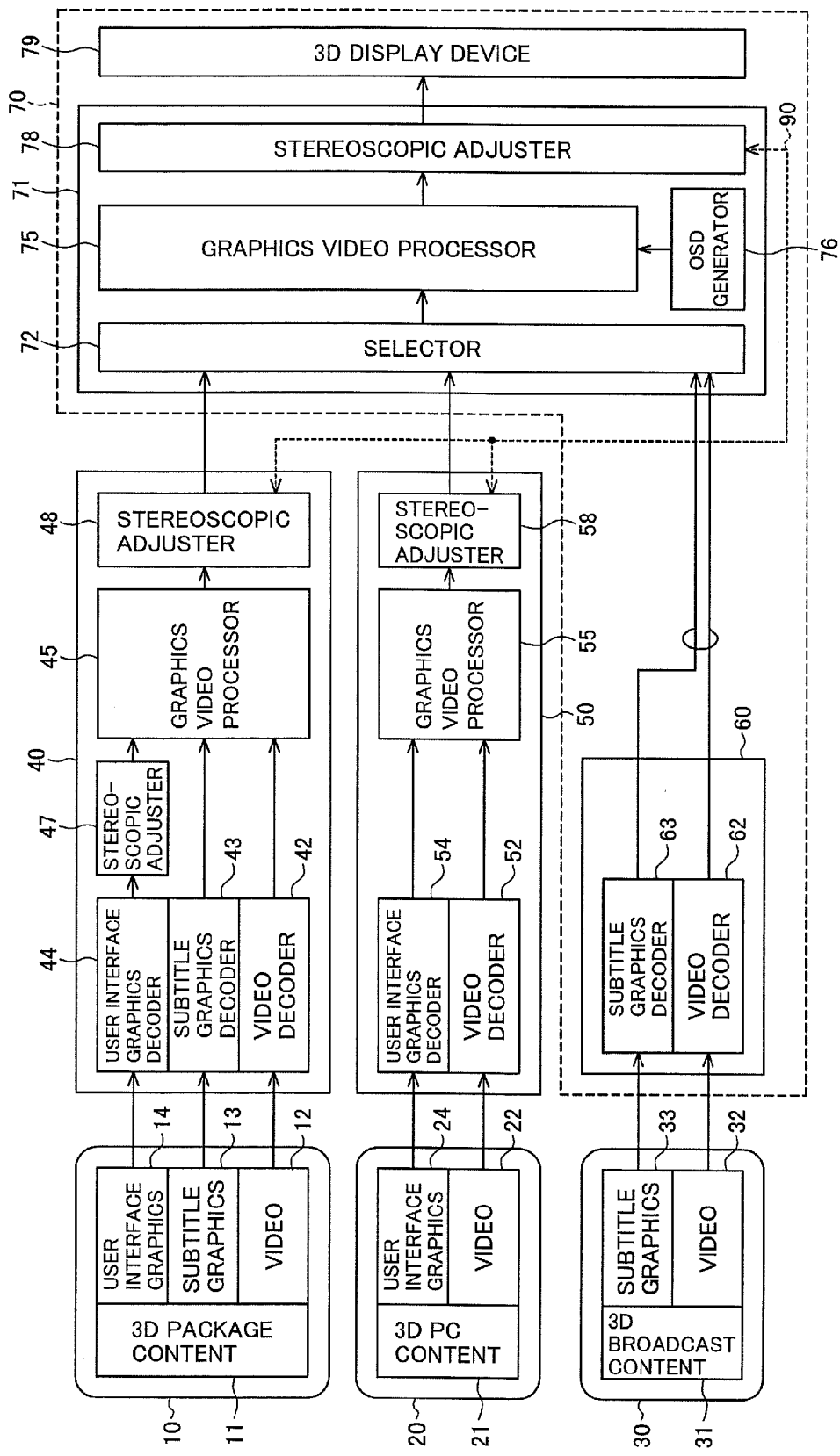
FIG. 1 schematically illustrates the overall structure of a video reproducing and display system having a stereoscopic adjustment system including a video display control apparatus according to a first embodiment of the invention.

Embodiments of the invention will now be described with reference to the attached drawings, in which like elements are indicated by like reference characters.

First Embodiment

The first embodiment contemplates the display, by a single 3D display device, of three types of 3D content (stereoscopic video content): 3D package content, which is supplied on recording media such as Blu-ray discs; 3D PC content, which is supplied on personal-computer-oriented data media for reproduction by a personal computer or game machine; and 3D broadcast content, which is supplied by television program broadcasting.

FIG. 1 shows the general configuration of a video reproducing and display system having a video display control apparatus according to the first embodiment for adjustment of the stereoscopic effect (3D effect). The video reproducing and display system includes a disc video reproducing device 40, a PC video reproducing device 50, a broadcast video reproducing device 60, a 3D video display processor 71, and a 3D display device 79.

The disc video reproducing device 40 includes a video decoder 42, a subtitle graphics decoder 43, a user interface graphics decoder 44, a graphics video processor 45, and a pair of stereoscopic adjusters 47, 48.

The PC video reproducing device 50 includes a video decoder 52, a user interface graphics decoder 54, a graphics video processor 55, and a stereoscopic adjuster 58.

The broadcast video reproducing device 60 includes a video decoder 62 and a subtitle graphics decoder 63.

The 3D video display processor 71 includes a selector 72, a graphics video processor 75, an on-screen display (OSD) generator 76, and a stereoscopic adjuster 78.

First the 3D content to be reproduced will be described. 3D package content 11 is recorded on a disc medium 10. The data in the 3D package content 11 that are concerned with 3D display include video 12, subtitle graphics 13, and user interface graphics 14. 3D PC content 21 is stored on a PC data medium 20. The data in the 3D PC content 21 that are concerned with 3D display include video 22 and user interface graphics 24. 3D broadcast content 31 is included in a broadcast television program 30. The data in the 3D broadcast content 31 that are concerned with 3D display include video 32 and subtitle graphics 33.

When this 3D content is reproduced and displayed, 3D package content 11 is reproduced by the disc video reproducing device 40, 3D PC content 21 is reproduced by the PC video reproducing device 50, and 3D broadcast content 31 is reproduced by the broadcast video reproducing device 60. In all cases, the reproduced 3D image data pass through the 3D video display processor 71 and are displayed to the viewer as a 3D video image by the 3D display device 79.

The broadcast video reproducing device 60, 3D video display processor 71, and 3D display device 79 constitute a television receiver 70, generally referred to as a 3D TV. Products combining the disc video reproducing device 40 and television receiver 70 into a single unit are also contemplated. In another possible configuration the 3D video display processor 71 and 3D display device 79 are combined to form a display device or monitor, the broadcast video reproducing device 60 being separate. In the description below, the combination of the 3D video display processor 71 and 3D display device 79 will be referred to as a stereoscopic video display device. The term 'stereoscopic video content reproducing device' will mean the disc video reproducing device 40, the PC video reproducing device 50, or the combination thereof.

If the disc medium 10 is a Blu-ray disc, the disc video reproducing device 40 that reproduces the 3D package content 11 is a Blu-ray disc player. The PC video reproducing device 50 that reproduces 3D video data from the 3D PC content 21 recorded on the PC data medium 20 is typically a personal computer, including both the computer hardware and software.

The procedures for displaying 3D content 11, 21, 31 as 3D video are as follows.

First the procedure for 3D display of 3D broadcast content 31 will be described. The data representing the video 32 in the 3D broadcast content 31 are reproduced by the video decoder 62 in the broadcast video reproducing device 60, the data representing the subtitle graphics 33 are reproduced by the subtitle graphics decoder 63, and the reproduced data are input to the 3D video display processor 71. The selector 72, which is located at the input end of the 3D video display processor 71, selects either the video data output from the broadcast video reproducing device 60, including outputs of both the video decoder 62 and subtitle graphics decoder 63, or video data output from a source external to the television receiver 70, such as the disc video reproducing device 40 or PC video reproducing device 50. In the present case the selector 72 selects the video data output from the broadcast video reproducing device 60.

The 3D video data selected by the selector 72 are input to the graphics video processor 75 and combined with on-screen display video data generated by the OSD generator 76. The purpose of the on-screen display is to guide the user in operating the television receiver 70 by providing a graphic user interface (GUI). The combined output of the graphics video processor 75 is supplied to the stereoscopic adjuster 78, processed in a novel way as described later to adjust the stereoscopic effect, and then sent as adjusted 3D video data to the 3D display device 79.

In an alternative configuration, a video combiner (not shown) combines the video data output by the video decoder 62 with the video data output by the subtitle graphics decoder 63, and the combined video data are input to the selector 72.

Next the procedure for 3D display of 3D package content 11 will be described. The data representing the video 12 in the 3D package content 11 are reproduced by the video decoder 42 in the disc video reproducing device 40, the data representing the subtitle graphics 13 are reproduced by the subtitle graphics decoder 43, the data representing the user interface graphics 14 are reproduced by the user interface graphics decoder 44, and the reproduced data, which in each case are reproduced as 3D video data, are input to the graphics video processor 45. A stereoscopic adjustment function may be built into the individual content. If, for example, such an adjustment function is built into the user interface graphics 14, the data output from the user interface graphics decoder 44 are adjusted by stereoscopic adjuster 47, as shown, before input to graphics video processor 45.

Graphics video processor 45 combines the three types of 3D video data according to the format of the content to generate 3D video data for the 3D package content 11 as a whole. Stereoscopic adjuster 48 then performs novel processing, described later, to adjust the stereoscopic effect of the combined 3D video data within the disc video reproducing device 40.

The combined and adjusted 3D video data are now input to the 3D video display processor 71 in the television receiver 70, selected by the selector 72, processed as described above by graphics video processor 75 and stereoscopic adjuster 78, and displayed as 3D video by the 3D display device 79.

Since the stereoscopic effect of the 3D package content 11 is adjusted by both stereoscopic adjusters 48 and 78 while the stereoscopic effect of the 3D broadcast content 31 is adjusted only by stereoscopic adjuster 78, stereoscopic adjuster 78 operates so as to produce the best stereoscopic effect for the viewer when 3D broadcast content 31 is displayed, and stereoscopic adjuster 48 operates so that the combined effect of the adjustments made by stereoscopic adjusters 48 and 78 produces the best stereoscopic effect for the viewer when 3D package content 11 is displayed. In other words, stereoscopic adjuster 48 compensates for the difference between the settings for the optimal adjustment for 3D package content 11 and the settings for the adjustment that stereoscopic adjuster 78. The difference arises because if the stereoscopic effect desired for 3D broadcast content 31 is taken as the standard effect, 3D package content 11 may require special adjustment settings, differing from the standard settings.

Next the procedure for 3D display of 3D PC content 21 will be described. The data representing the video 22 in the 3D PC content 21 are reproduced by the video decoder 52 in the PC video reproducing device 50, the data representing the user interface graphics 24 are reproduced by the user interface graphics decoder 54, and the reproduced data, which in each case are reproduced as 3D video data, are input to graphics video processor 55. Graphics video processor 55 combines the two types of 3D video data according to the format of the content to generate 3D video data for the 3D PC content 21 as a whole. Stereoscopic adjuster 58 then performs novel processing, described later, to adjust the stereoscopic effect of the combined 3D video data within the PC video reproducing device 50.

The above description assumes that the 3D PC content 21 lacks subtitle graphics. In an alternative configuration, the 3D PC content 21 may include subtitle graphics, the PC video reproducing device 50 has the same internal configuration as the disc video reproducing device 40, and the PC video reproducing device 50 may reproduce 3D package content 11 as well as 3D PC content 21.

The 3D video data output from the PC video reproducing device 50 are input to the 3D video display processor 71 in the television receiver 70, selected by the selector 72, processed by graphics video processor 75 and stereoscopic adjuster 78 in the same way as 3D broadcast content 31, and displayed as 3D video by the 3D display device 79.

The adjustments performed by stereoscopic adjusters 58 and 78 for 3D PC content 21 are similar to the adjustments performed by stereoscopic adjusters 48 and 78 for 3D package content 11. Stereoscopic adjuster 58 performs an adjustment that compensates for the difference between the settings for the adjustment performed by stereoscopic adjuster 78 and the settings for the optimal adjustment for 3D PC content 21, so that the combined adjustment performed by the stereoscopic adjuster 58 and stereoscopic adjuster 78 provides the viewer of 3D PC content 21 with the best stereoscopic effect.

The subtitle graphics 13, 33 and user interface graphics 14, 24 are not limited to subtitle text and button graphics. They may be any type of graphics complying with the specifications for subtitle graphics and user interface graphics.

Next the problems encountered in 3D display of different types of content and the solutions provided by the present embodiment will be described.

When 3D broadcast content 31 is created by, for example, the broadcaster who broadcasts the content or a content provider who provides the content to the broadcaster, standard values are assumed for the screen size of the 3D display device, the viewing distance and angle, the viewer's 3D perception and preferences, and other viewing conditions, and the 3D broadcast content 31 is created for optimal stereoscopic viewing under the assumed conditions. The actual screen size, viewing distance, viewing angle, and viewer's perception and preferences differ from one viewer to another, but stereoscopic adjuster 78 in the present invention enables the individual viewer to adjust the stereoscopic effect to compensate for the difference between the assumed standard conditions and the viewer's actual conditions.

If 3D package content 11 is created under the same assumed standard conditions as 3D broadcast content 31, then the adjustments the viewer makes for 3D broadcast content 31 will also work for 3D package content 11 without the need for further adjustment by stereoscopic adjusters 47 and 48. Different types of content, however, tend to be created under different assumed conditions: 3D package content 11 is often originally created for viewing on a large screen in a theater; 3D broadcast content 31 is created for viewing on the medium-size screen of a typical television receiver; 3D PC content 21 is created for viewing on the comparatively small screen of a computer monitor, or on just part of that small screen, while the rest of the screen is used for other work.

The stereoscopic adjuster 48 in the disc video reproducing device 40 is therefore set for the best 3D display of 3D package content 11 while the stereoscopic adjuster 78 remains set for the best 3D display of 3D broadcast content 31. If the parameter settings of stereoscopic adjuster 78 are changed, the change is preferably communicated to stereoscopic adjuster 48. The viewer may then be offered the option of leaving stereoscopic adjuster 48 at its existing settings or having stereoscopic adjuster 48 make a compensating change to cancel out the change in the settings of stereoscopic adjuster 78. The latter option enables the user to view different types of 3D video content with different stereoscopic effects without having a readjustment of the stereoscopic effect of one type of content alter the stereoscopic effect of other types of content.

Similarly, if the settings of stereoscopic adjuster 48 are changed, the change is preferably communicated to stereoscopic adjuster 78, and the viewer is preferably allowed to choose whether to leave stereoscopic adjuster 78 at its existing settings or have stereoscopic adjuster 78 make a compensating change.

A similar capability for making automatic compensatory setting changes should also be provided for stereoscopic adjuster 58 in the PC video reproducing device 50.

The first embodiment accordingly provides an adjuster-to-adjuster communication channel 90 for communication among stereoscopic adjusters 48, 58, and 78. The information communicated is the values of the parameter settings of each stereoscopic adjuster. Since the quantity of data to be communicated is small, the adjuster-to-adjuster communication channel 90 can be implemented by using idle time on the interface used for transmitting 3D video data.

For simplicity, stereoscopic adjusters 48, 58, and 78 are shown as linked by a single branched communication channel 90, but other arrangements are possible. For example, stereoscopic adjusters 48 and 78 may be linked by one communication channel and stereoscopic adjusters 58 and 78 by another communication channel.

Figure 2:
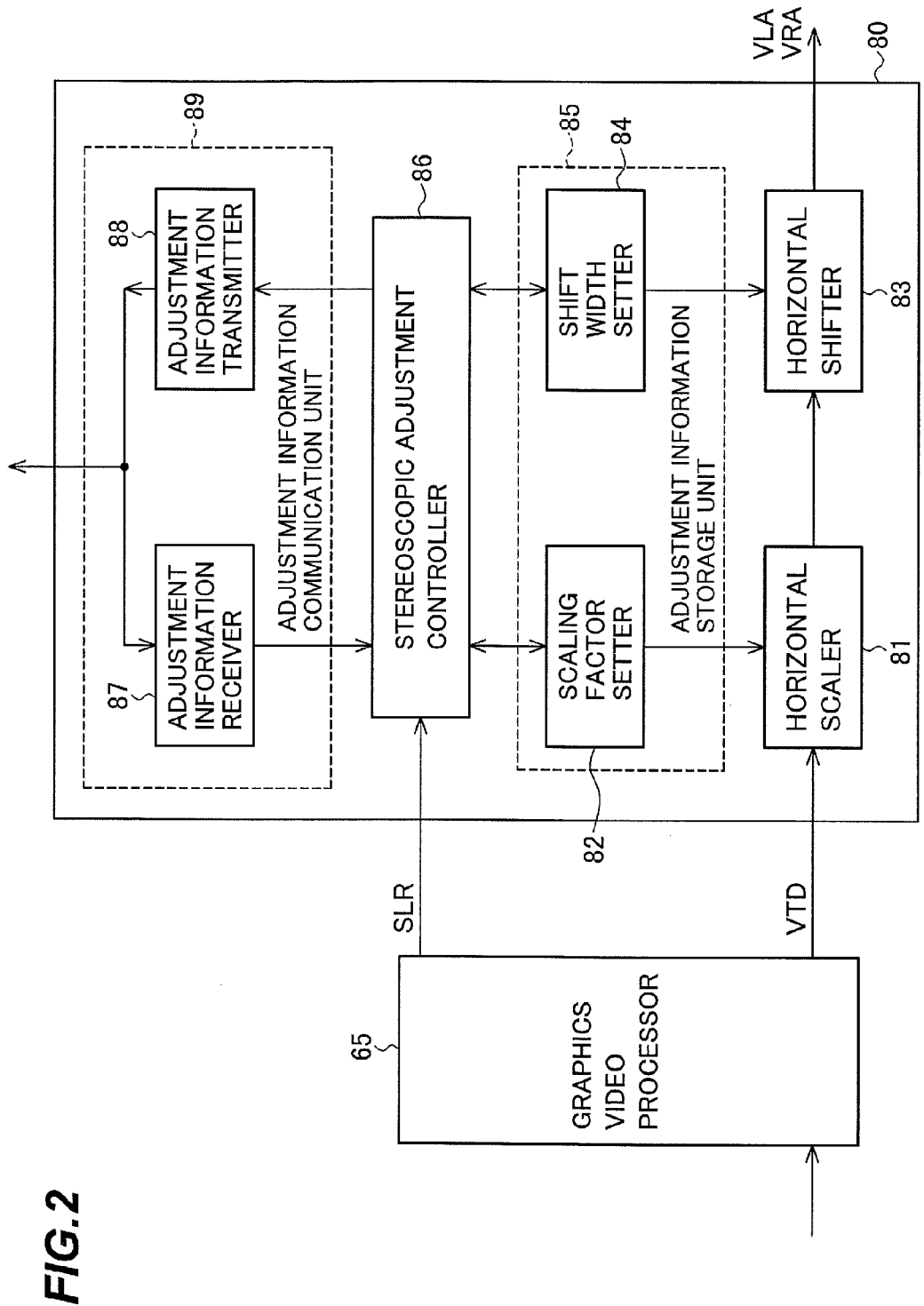
FIG. 2 is a block diagram showing the internal structure of the stereoscopic adjusters 48, 58, 78 in FIG. 1.

The internal structure of stereoscopic adjusters 48, 58, and 78 will now be described with reference to FIG. 2, which shows a generic stereoscopic adjuster 80 connected to a generic graphics video processor 65, representing any one of the graphics video processors 45, 55, 75 in FIG. 1. The stereoscopic adjusters 48, 58, 78 in FIG. 1 all have the same internal structure as the stereoscopic adjuster 80 in FIG. 2.

The graphics video processors 45, 55, 75 also have mutually identical internal structures.

The function of the stereoscopic adjuster 80 is to modify a pair of images with mutual parallax. The modification may be performed so as to change the parallax of the pair of images. The stereoscopic adjuster 80 in FIG. 2 includes a horizontal scaler 81, a scaling factor setter 82, a horizontal shifter 83, a shift width setter 84, a stereoscopic adjustment controller 86, an adjustment information receiver 87, and an adjustment information transmitter 88.

As input, the stereoscopic adjuster 80 receives 3D video data VTD (including left screen data and right screen data) from the graphics video processor 65. The 3D video data are input to the horizontal scaler 81 in the stereoscopic adjuster 80. Simultaneously, a left/right screen identification signal SLR is input to the stereoscopic adjustment controller 86 in the stereoscopic adjuster 80. The 3D video data include left-eye video data, also referred to as left-screen data, and right-eye video data, also referred to as right-screen data. The left/right screen identification signal SLR indicates whether the data currently being input to the horizontal scaler 81 are left-screen data or right-screen data.

The horizontal scaler 81 changes the horizontal length of the input left- or right-screen data by enlarging or reducing (scaling) the input data by a specified horizontal ratio to generate scaled left-screen data and scaled right-screen data, and sends the scaled data to the horizontal shifter 83. The horizontal shifter 83 shifts the horizontal positions of the scaled left-screen data and scaled right-screen data by amounts specified by the shift width setter 84 and outputs the shifted data as adjusted left-screen data VLA and adjusted right-screen data VRA.

As described below, scaling and shifting are carried out so that the adjusted image fits completely within the display screen, with one vertical edge of the adjusted image aligned with the corresponding edge of the display screen and the other vertical edge of the adjusted image located between the two vertical edges of the display screen.

If the stereoscopic adjuster 80 represents stereoscopic adjuster 48 or 58, the adjusted image data output from the horizontal shifter 83, representing a pair of images, are supplied to the selector 72 in FIG. 1. If the stereoscopic adjuster 80 represents stereoscopic adjuster 78, the adjusted image data output from the horizontal shifter 83, representing a pair of images, are supplied to the 3D display device 79.

The stereoscopic adjustment performed on each pair of images may include modifying the pair of images by horizontal scaling of both of the pair of images and horizontal shifting of at least one of the pair of images to align a left edge of one of the resulting pair of images with a left edge of the screen and align a right edge of another one of the resulting pair of images with a right edge of the screen.

The stereoscopic adjustment controller 86 controls the scaling factor setter 82 and shift width setter 84 in synchronization with the left/right screen identification signal SLR so that the horizontal scaler 81 and scaling factor setter 82 switch between the scaling and shift values suitable for a left screen image and the scaling and shift values suitable for a right screen image at the appropriate times. Since the scaling factor setter 82 and shift width setter 84 hold the scaling and shift values used as adjustment information or setting information by the horizontal scaler 81 and horizontal shifter 83 for controlling the stereoscopic adjustment, the scaling factor setter 82 and shift width setter 84 will be referred to collectively as an adjustment information storage unit 85

To enable the adjustment function to be shared among the stereoscopic adjusters 48, 58, 78, the stereoscopic adjustment controller 86 transmits the scaling and shift values held in the adjustment information storage unit 85 through the adjustment information transmitter 88 to an external device, and receives data pertaining to stereoscopic effect adjustment from a different stereoscopic adjuster or another external device through the adjustment information receiver 87, processes the received data, and sets the processed results in the adjustment information storage unit 85. The adjustment information receiver 87 and adjustment information transmitter 88 constitute an adjustment information communication unit 89.

An example of the stereoscopic adjustment process is shown in FIGS. 3A to 3C.

FIG. 3A shows the screen on which the left-eye image is displayed and the screen on which the right-eye image is displayed. Although two separate screens are shown, it will be appreciated that both screens may be the same physical screen.

FIG. 3B illustrates the unadjusted left-screen data and right-screen data. The data represent an image that fills the entire screen. For illustrative purposes, the data are shown as representing five vertical stripes L1-L5 and R1-R5.

FIG. 3C illustrates the adjusted left-screen data and right-screen data. The left screen data VLA have been horizontally scaled by the horizontal scaler 81 and shifted by the horizontal shifter 83 to reduce the width of the left-eye image and align its right edge with the right edge of the screen. The right screen data VRA have been horizontally scaled and shifted to reduce the width of the right-eye image and align its left edge with the left edge of the screen.

For comparison, FIG. 3D shows the conventional adjustment made in the prior art. The left screen data are shifted right with respect to the screen, leaving a non-displayed area NDA and an overflow data area ODA (stripe L5), the data in which are lost. Similarly the right screen data are shifted left, leaving a non-displayed area NDA and an overflow data area ODA (stripe R1), the data in which are lost.

Non-displayed areas NDA are also present in the adjusted screen data VLA and VRA in the first embodiment. These areas are similar to the black areas left at the right and left edges of a screen with a 16:9 aspect ratio when an image having the standard 4:3 television aspect ratio is displayed without scaling. Their presence does not cause the viewer any particular inconvenience.

The width of the images displayed on the screen is reduced by the scaling factor set in the scaling factor setter 82. In practice the scaling factor is approximately 90% or greater. This may be compared with the 133% scaling factor used when a standard 4:3 television picture is displayed on a 16:9 wide screen. Since viewers are known to tolerate the 33% distortion caused by 133% scaling, it can be assumed that they will easily tolerate the 10% distortion caused by 90% scaling.

Figures 4A, 4B, 4C, 4D:
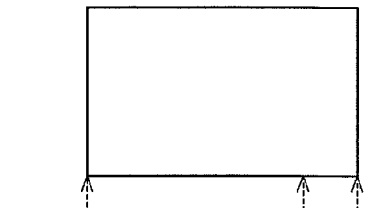
FIG. 4A illustrates the display screen of the 3D display device in FIG. 1.
FIG. 4B shows unadjusted left-eye and right-eye image data.
FIG. 4C shows another exemplary novel adjustment of the left-eye and right-eye image data.
FIG. 4D shows the corresponding conventional adjustment of the left-eye and right-eye image data.

Another example of the stereoscopic adjustment process is shown in FIGS. 4A to 4C. FIG. 4A shows the screens on which the left- and right-eye images are displayed. FIG. 4B shows the unadjusted data VTD, again representing vertical stripes L1-L5 and R1-R5. FIG. 4C shows the adjusted data VLA and VRA. The data are scaled by the horizontal scaler 81 as in the preceding example, but the horizontal shifter 83 now shifts the left-screen data so that the left edge of the adjusted left-eye image is aligned with the left edge of the screen, and shifts the right-screen screen data so that the right edge of the adjusted left-eye image is aligned with the right edge of the screen. Non-displayed areas NDA are left at the right edge of the left screen and the left edge of the right screen. FIG. 4D shows a corresponding conventional adjustment that produces an overflow data area ODA as well as a non-displayed data area NDA.

The direction of the shift determines the direction in which the image appears to move with respect to the viewer. The adjustments illustrated in FIGS. 3C and 3D exaggerate the stereoscopic effect by appearing to draw the image toward the viewer. The adjustments in FIGS. 4C and 4D exaggerate the stereoscopic effect by appearing to push the image away from the viewer.

More specific examples of stereoscopic adjustment will be given with reference to FIGS. 5A to 5D, 6A to 6D, 7A to 7D, and 8A to 8D. These are plan views in which the vertical axis represents the depth direction, reference characters VW indicate the depth position of the viewer's left eye YL and right eye YR, and reference characters SCN indicate the depth position of the display screen.

Reference characters SWa, SWb, and SWc indicate the horizontal width of the display screen at depth position SCN, between the left edge EL and right edge ER of the screen.

In each drawing, the scale marks extending vertically downward from the screen position line SCN indicate positions at which left screen data are displayed, and the scale marks extending vertically upward from the screen position line SCN indicate positions at which right screen data are displayed. LH0 indicates the actual or virtual left edge, and LH8 indicates the actual or virtual right edge, of the displayed left-eye image. Similarly, RH0 indicates the actual or virtual left edge, and RH8 indicates the actual or virtual right edge, of the displayed right-eye image. A virtual edge is not actually displayed because it is located beyond the width of the screen.

The positions at which parts of the image are displayed on the left screen and right screen are indicated by small circles and crosses (o's and x's). The same symbols and reference characters PV1 and PV2 are used to indicate the depth positions of virtual images perceived by the viewer.

SWa is the standard screen size. SWb and SWc are different screen sizes. In the drawings, SWb is one-half SWa, and SWc is twice SWa.

FIGS. 5A, 6A, 7D, and 8D show an image being viewed with the standard screen size SWa. The left-screen data and right-screen data VTD input to the stereoscopic adjuster 80 in FIG. 2 are assumed to be configured to give an appropriate stereoscopic effect when viewed on a screen of the standard size SWa.

FIGS. 5A to 5D show exemplary conventional stereoscopic adjustments. If 3D content designed to produce an appropriate stereoscopic effect when displayed on the screen with the standard size SWa (FIG. 5A) is viewed without adjustment on a screen of size SWb, half the standard size, it is seen as in FIG. 5C. FIGS. 5B and 5D show the results of conventional adjustments. FIG. 5C corresponds to the unadjusted state shown in FIGS. 3B and 4B, FIG. 5B shows the result of the conventional adjustment shown in FIG. 3D, and FIG. 5D shows the result of the conventional adjustment shown in FIG. 4D.

On the screen for the left eye, an 'x' is displayed at the central position LH4 and an 'o' is displayed at position LH5, to the right of LH4. On the screen for the right eye, an 'x' is displayed at the central position RH4 and an 'o' is displayed at position RH3, to the left of RH4. The lines of sight from the left and right eyes to the o's displayed on the left and right screens intersect at position PV1, so an 'o' is perceived in this virtual position. The lines of sight from the left and right eyes to the x's displayed on the left and right screens intersect in the plane of the screen, at position PV2, where an 'x' is perceived.

A comparison of FIGS. 5B to 5D shows that the depths at which the 'x' and the 'o' are perceived change according to the size of the screen, and can be further changed by the stereoscopic adjustment.

In FIG. 5B, the 3D image is pulled forward by the adjustment in FIG. 3D to display the 'o' at approximately its original position in FIG. 5A, but this adjustment pushes the right edge of the left-eye image and the left edge of the right-eye image off the screen, so these parts of the displayed image are lost.

FIGS. 6A to 6D illustrate the novel adjustment performed in the first embodiment. FIGS. 6A and 6C show the unadjusted state, which is the same as in FIGS. 5A and 5C. FIG. 6C accordingly corresponds to FIGS. 3B and 4B, while FIG. 6B shows the result of the adjustment in FIG. 3C and FIG. 6D shows the result of the adjustment in FIG. 4C.

As in FIGS. 5A to 5D, an 'o' is perceived where the lines of sight from the left and right eyes cross at virtual position PV1, and an 'x' is similarly perceived at virtual position PV2. A comparison of FIGS. 6B to 6D shows that the depths at which the 'x' and the 'o' are perceived change according to the size of the screen, and can be further changed by the novel stereoscopic adjustment.

In FIG. 6B, the 3D image is pulled forward by the adjustment in FIG. 3C to display the 'o' at approximately its original position in FIG. 6A. This time the edges LH0 and LH8 of the left-eye image and the edges RH0 and RH8 of the right-eye image all remain on the screen, so no data are lost.

It is not possible to display all-objects in the 3D image at their original positions in FIG. 6A, so the adjustment that is best for an assumed viewer is used. A control may be provided by which the viewer can change the adjustment while viewing the 3D image. As shown in FIG. 6D, even if the viewer selects the adjustment in FIG. 4C, the edges LH0, LH8, RH0, RH8 of the left- and right-eye images all remain on the screen.

FIGS. 7A to 7D show further examples of conventional stereoscopic adjustments. In these examples, the viewing of 3D content on a screen of the standard size SWa is depicted in FIG. 7D, and the viewing of the same 3D content on a screen of size SWc, twice the standard size, is depicted in FIGS. 7A to 7C.

If 3D content designed to produce an appropriate stereoscopic effect when displayed on the screen with the standard size SWa (FIG. 7D) is viewed without adjustment on a screen of size SWc, twice the standard size, it is seen as in FIG. 7B. FIGS. 7A and 7C show the results of conventional adjustments. FIG. 7B corresponds to the unadjusted state shown in FIGS. 3B and 4B, FIG. 7A shows the result of the conventional adjustment shown in FIG. 3D, and FIG. 7C shows the result of the conventional adjustment shown in FIG. 4D.

The x's and o's and the reference characters PV1 and PV2 have the same meaning as in FIGS. 5A to 5D and FIGS. 6A to 6D.

In FIG. 7C, the 3D image is pushed back by the adjustment in FIG. 4D to display the 'o' at approximately its original position in FIG. 7D, but this adjustment pushes the left edge of the left-eye image and the right edge of the right-eye image off the screen, so these parts of the displayed image are lost. Similarly, in FIG. 7A the right edge of the left-eye image and the left edge of the right-eye image are lost.

FIGS. 8A to 8D illustrate the novel adjustment performed in the first embodiment. FIGS. 8B and 8D are identical to FIGS. 7B and 7D. The 3D content is designed to produce an appropriate stereoscopic effect when displayed on a screen with the standard size SWa as in FIG. 8D. FIG. 8A to FIG. 8C show the same content displayed on a screen of width SWc, double the standard width.

FIG. 8B shows the unadjusted state, corresponding to FIGS. 3B and 4B. FIG. 8A shows the result of the adjustment in FIG. 3C and FIG. 8C shows the result of the adjustment in FIG. 4C.

The x's and o's and the reference characters PV1 and PV2 have the same meaning as in FIGS. 5A to 5D, FIGS. 6A to 6D, and FIGS. 7A to 7D. Lines of sight from the left and right eyes to the o's in the left- and right-screen images intersect at point PV1, where the 'o' is perceived. Similarly, the 'x' is perceived at point PV2, where the lines of sight from the left and right eyes to the x's in the left- and right-screen images intersect.

A comparison of FIGS. 8A to 8C shows that the depth positions PV1 and PV2 at which the 'x' and the 'o' are perceived change according to the size of the screen, and can be further changed by the stereoscopic adjustment.

In FIG. 8C, the 3D image is pushed back by the adjustment in FIG. 4C to display the 'o' at approximately its original position in FIG. 8D. It is not possible to display all objects in the 3D image at their original positions in FIG. 8D, so the adjustment that is best for an assumed viewer is used. A control may be provided by which the viewer can change the adjustment while viewing the 3D image. As shown in FIGS. 8A and 8C, regardless of which adjustment the viewer selects, all parts of the left- and right-eye images remain on the screen and no data are lost, in contrast to the conventional adjustments illustrated in FIGS. 7A to 7C.

The left-screen data and right-screen data may be expressed in several formats in the 3D video display data. The application of the novel adjustment shown in FIG. 3C to several of the major formats will now be described with reference to FIGS. 9A to 9I.

FIG. 9A illustrates a frame packing format in which the left screen and right screen both have full high-definition resolution (1920×1080 pixels). Taken together, the left and right screens include 1920×2160 pixels. The horizontal scaler 81 compresses the data horizontally, and the horizontal shifter 83 shifts the horizontally compressed images so that, as shown in FIG. 9F, the right edge of the left screen image matches the right edge of the display screen (shown in FIG. 9E) and the left edge of the right screen image matches the left edge of the display screen.

FIG. 9B shows a top-and-bottom format in which the left and right screens both have half the full high-definition resolution (1920×540 pixels), the vertical resolution of each screen being reduced by half. Taken together, the left and right screens include 1920×1080 pixels. The horizontal scaler 81 and horizontal shifter 83 compress and shift the data as shown in FIG. 9G, again aligning the right edge of the left screen image with the right edge of the display screen and the left edge of the right screen image with the left edge of the display screen.

FIG. 9C shows a line-by-line format in which the left and right screens both have half the full high-definition resolution (1920×540 pixels) but their data are interleaved line by line. Taken together, the left and right screens again include 1920×1080 pixels. The horizontal scaler 81 and horizontal shifter 83 compress and shift the data as shown in FIG. 9H, so that the right edge of each horizontal line in the left screen image is aligned with the right edge of the display screen and the left edge of each horizontal line in the right screen image is aligned with the left edge of the display screen.

FIG. 9D shows a side-by-side format in which the left and right screens both have half the full high-definition resolution (960×1080 pixels), the horizontal resolution of each screen being reduced by half. Taken together, the left and right screens include 1920×1080 pixels. The horizontal scaler 81 and horizontal shifter 83 compress and shift the data as shown in FIG. 9I, so that when displayed, the right edge of the left screen image is aligned with the right edge of the display screen and the left edge of the right screen image is aligned with the left edge of the display screen.

After the processing shown in FIGS. 9F to 9I, the adjusted data are output to the next stage. The adjustment shown in FIG. 4C is carried out similarly, except that the shifts are made in different directions.

When the stereoscopic adjuster 80 has been set to produce the optimal stereoscopic effect for a given display screen size, viewing distance, and other viewing conditions, the resulting scaling and shift parameters are stored in the adjustment information storage unit 85 in the stereoscopic adjuster 80 so that when 3D content is reproduced thereafter, the settings can be switched according to the content and viewing conditions to produce the optimal stereoscopic effect. A 3D television set (including the television receiver 70 alone, the television receiver 70 and disc video reproducing device 40, or the combination of the 3D video display processor 71 and 3D display device 79) or a Blu-ray disc player used as a disc video reproducing device 40 is typically used by several different people, who may have different preferences regarding stereoscopic effects. The optimal adjustment parameters for each user may be stored so that the parameters can be switched to suit the person watching the 3D video display.

Within the general category of 3D broadcast content, the optimal adjustment parameters may also differ depending on the genre of the program being watched, so it is also contemplated that the 3D television set may include control means by which the viewer can adjust the parameters for each program, or select from among a set of prestored parameters, or means for switching the parameters automatically according to program description information accompanying the broadcast.

To enable these functions to be implemented in a distributed manner across the three stereoscopic adjusters 48, 58, 78, the stereoscopic adjusters 48, 58, 78 notify each other of their stereoscopic adjustment parameters via the adjuster-to-adjuster communication channel 90. In one scheme, the stereoscopic adjuster 78 acts as the master device by reading the current stereoscopic adjustment parameters of the other two stereoscopic adjusters 48, 58, calculating the best way to distribute the optimal adjustment, setting its own parameters according to the results of the calculation, and then notifying the other two stereoscopic adjusters 48, 58 of the parameters that they are to set, thereby controlling the stereoscopic adjustment of the 3D video display produced by the video reproducing and display system as a whole.

Alternatively, the stereoscopic adjustment parameters of only one of the two stereoscopic adjusters 48 and 58 that is included in the disc video reproducing device 40 or PC video reproducing device 50 whose output is selected by the selector 72 may be read, and transmitted to the stereoscopic adjuster 78, and the transmitted adjustment parameters and the adjustment parameters stored in the stereoscopic adjuster 78 may used for determining the parameters to be set and used for controlling the stereoscopic adjustment performed by each of the stereoscopic adjuster 78 and the stereoscopic adjuster 48 or 58.

Still alternatively, the stereoscopic adjuster 48 may control the stereoscopic adjustment which it performs, according to both the adjustment parameters stored within the stereoscopic adjuster 48 and the adjustment parameters received from the stereoscopic adjuster 78, when the output of the disc video reproducing device 40 is selected by the selector 72. Similarly, the stereoscopic adjuster 58 may control the stereoscopic adjustment which it performs, according to both the adjustment parameters stored within the stereoscopic adjuster 58 and the adjustment parameters received from the stereoscopic adjuster 78, when the output of the PC video reproducing device 50 is selected by the selector 72.

Examples of the processing carried out in the horizontal scaler 81 and horizontal shifter 83 will now be described with reference to FIGS. 10 and 11. In these drawings, the width GWa of the unadjusted image is equal to the width SW of the display screen, and the left and right edges of the unadjusted image (indicated in FIG. 6A as LH0 and LH8, or RH0 and RH8) match the left and right edges (EL, ER) of the display screen.

The horizontal scaler 81 leaves one part of the image, such as one edge of the image, the left edge, for example, in a fixed position and alters the distance from that part to the other parts of the image by a scaling factor $\beta$. In FIGS. 10 and 11 at (a) and (b), the distance from the left edge to the other parts of the image is multiplied by $\beta$, changing the width of the image from GWa to GWb (GWb=$\beta \times$GWa). The right edge of the image therefore moves (is shifted) to the left by a distance sa.

$$sa = GWa - GWb = GWa \times (1-\beta)$$

The horizontal shifter 83 shifts the scaled image as necessary. In FIG. 10 at (c), no shift is necessary because the left edge of the adjusted image is to be aligned with the left edge of the screen, so the shift width ha is zero. This case applies to the right-eye image in FIG. 6B, the left edge RH0 of which is aligned with the left edge EL of the display screen, and the left-eye image in FIG. 6D, the left edge LH0 of which is aligned with the left edge EL of the display screen.

Figure 11:
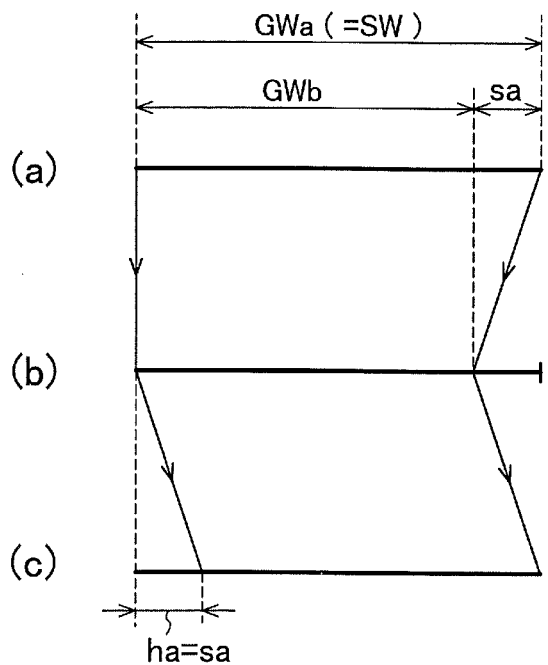

In FIG. 11 at (c), a shift ha by the above distance sa is necessary because the right edge of the adjusted image is to be aligned with the right edge of the screen. This case applies to the left-eye image in FIG. 6B, the right edge LH8 of which is aligned with the right edge ER of the display screen, and the right-eye image in FIG. 6D, the right edge RH8 of which is aligned with the right edge ER of the display screen.

The shift width ha is calculated in advance and stored in the shift width setting unit 84.

Figure 10:
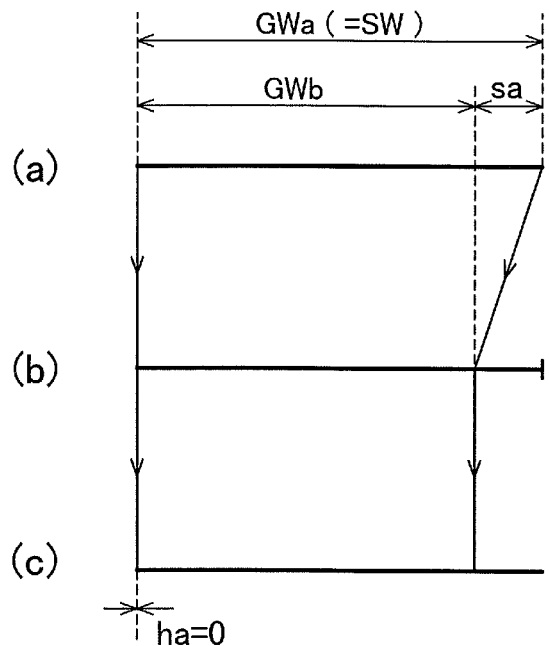
FIGS. 10 and 11 illustrate novel stereoscopic adjustments in which a single scaling factor and shift width are applied to the entire adjusted image.
Figure 12:
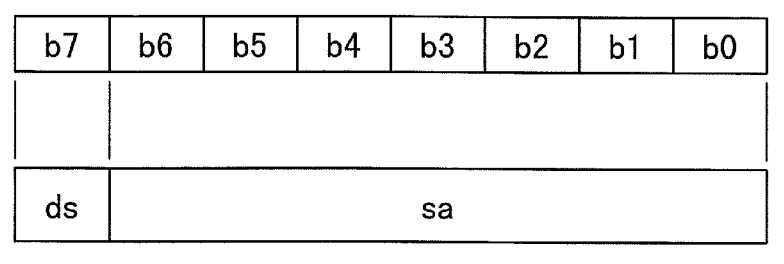

In the first embodiment, the scaling and shifting operations are carried out in the manner shown in FIG. 10 or 11, in which one edge of the image is fixed, and the distance from the one edge to the respective parts of the image is altered according to the scaling factor. Accordingly, the scaling and shifting parameters can be stored in a register in the adjustment information storage unit 85 as a single shift parameter value. This register has the eight-bit configuration shown in FIG. 12. The most significant bit (b7) is a sign bit ds indicating the direction of the shift. The other bits (b6-b0) indicate the number of pixels by which the shifted edge moves, the "number of pixels" being in terms of the pixel pitch before the stereoscopic adjustment. The adjustment parameter data are also transmitted on the adjuster-to-adjuster communication channel 90 in the format shown in FIG. 12.

The effect of the scaling operation on each pixel in the image can be calculated by dividing the parameter sa by the number of pixels in the horizontal width of the image to obtain a per-pixel shift width pw. The column of pixels at the fixed edge of the image is shifted by zero, the next column of pixels is shifted by pw, and this process continues, the size of the shift increasing by pw in each successive column.

In the first embodiment, since the left-eye and right-eye images are scaled by equal amounts, it is only necessary to store a single shift parameter sa, which determines both the shift width and the scaling factor. The only other necessary parameter is the direction bit ds, which can be used to distinguish between the adjustments in FIGS. 10 and 11.

The shift width ha of the shifting performed by the horizontal shifter 83 is equal either to zero, as in FIG. 10, or the value of the parameter sa, as in FIG. 11. It is therefore unnecessary to store a separate shift parameter. In the example shown in FIG. 12, the processing of the stereoscopic adjustment parameters is simple.

When the image is scaled by the horizontal scaler 81, the image part (pixel) which was at a pixel position in the screen of the display device forming the 3D display device 79 may no longer be at a pixel position in the screen of the display device in the scaled image. In such a case, the pixel values at pixel positions in the screen of the display device in the scaled image must be calculated by interpolation using the pixel values of the scaled image. The interpolation process may be performed on the scaled image by the horizontal scaler 81 or on the shifted image by the horizontal shifter 83.

When the interpolation process is performed by the horizontal scaler 81, an adjustment is made such that the shift width ha of the interpolated pixel by the horizontal shifter 83 will become an integer multiple of the pixel pitch in the screen of the display device. For instance, if the left edge of the scaled image is made to align the left edge of the screen of the display device, and if the pixel position at the right edge of the interpolated image is at a distances Δs (a value smaller than the pixel pitch) shifted further from the position to which the right edge has been shifted by the shift width sa by the horizontal scaling, the shift width ha by the shifting process by means of the horizontal shifter 83 is made to be equal to the sum of the shift width sa and the distance Δs.

The 3D package content reproduced by a Blu-ray disc player serving as the disc video reproducing device 40 may include embedded control software. That is, part of the content may be program code written in a programming language that can be executed by a processor in the Blu-ray disc player to control the Blu-ray disc player. Such software can read the parameters stored in the stereoscopic adjuster 48, as set parameters of the device, detects the parameters as representing the user's preferences with regard to the 3D effects, and make the viewer's preferences known to the 3D content itself.

The stereoscopic adjustment parameters stored in the disc video reproducing device 40 for 3D package content 11 represent the difference with respect to the optimal parameters for 3D broadcast content 31 set in the television receiver 70 and can therefore be regarded as representing the user's preferences regarding stereoscopic effects. If these preferences are known to the 3D content, the 3D content can proactively control the Blu-ray disc player in a way that suits the user's preferences.

If the Blu-ray disc player is used by more than one person, it may store different parameters for different users and may be equipped with a selector button or other means for identifying the user when the player is turned on, so that the 3D adjustment parameters suited for a particular user can be read.

Second Embodiment

Figure 13:
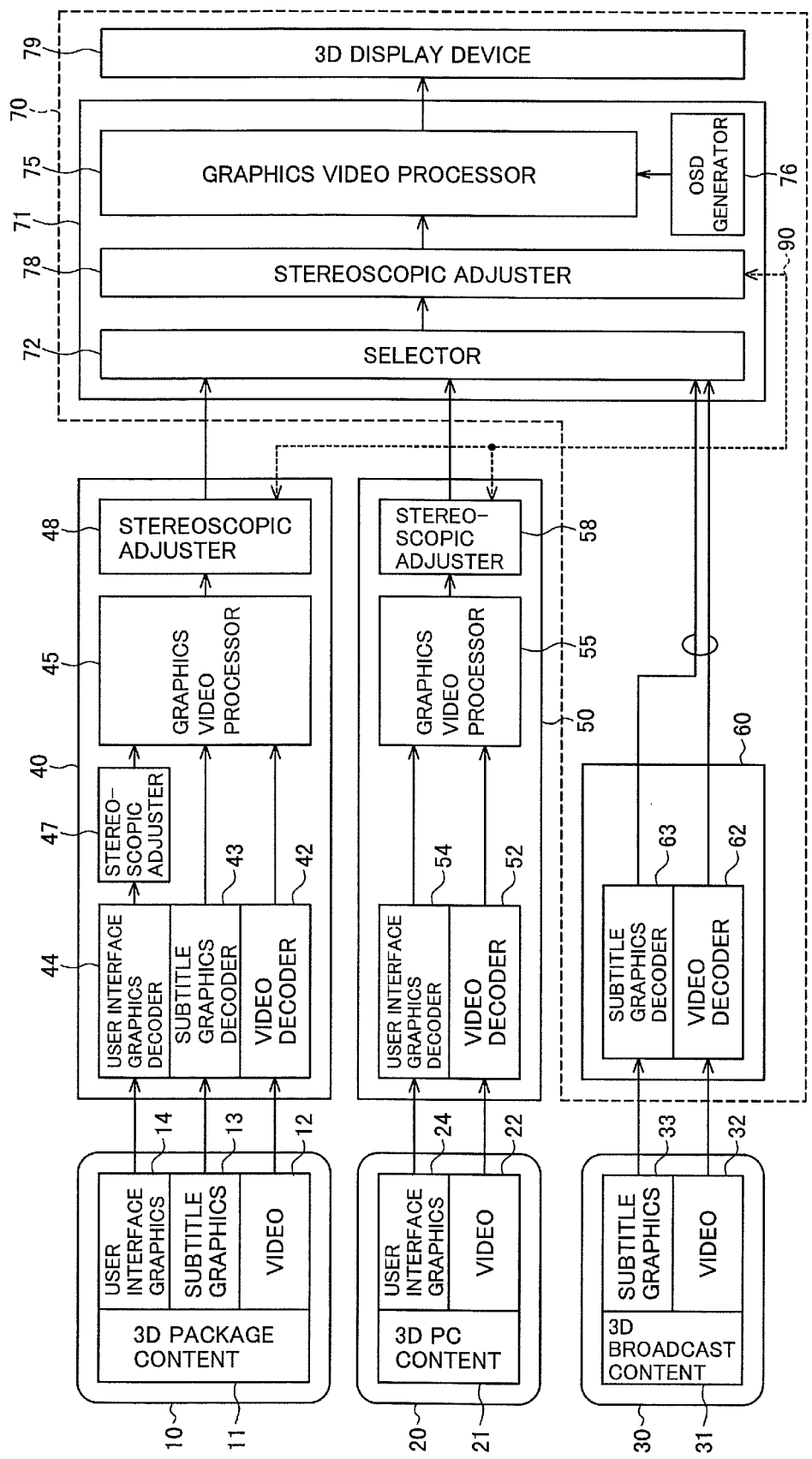
FIG. 13 schematically illustrates the overall structure of a video reproducing and display system having a stereoscopic adjustment system including a video display control apparatus according to a second embodiment of the invention.

Referring to FIG. 13, the video display control apparatus in the second embodiment is generally similar to the apparatus in the first embodiment shown in FIG. 1, but the positions of the graphics video processor 75 and stereoscopic adjuster 78 are interchanged. The 3D video data selected by the selector 72 are first input to the stereoscopic adjuster 78; after the stereoscopic effect is adjusted, the adjusted 3D video data are input to the graphics video processor 75.

Compared with the first embodiment, the second embodiment makes it possible to calculate the stereoscopic adjustment parameters that enable the stereoscopic adjusters 48, 58, 78 to cooperate to produce the desired stereoscopic effect, because the stereoscopic adjusters 48, 58, 78 are interconnected directly through the selector 72 without the intervention of the graphics video processor 75. For example, the shift parameter stored in the stereoscopic adjuster 78 can be added directly to the shift parameters stored in the other two stereoscopic adjusters 48, 58, taking account of the shift direction, to obtain an optimum adjustment value.

The configuration in the second embodiment also simplifies communication among the stereoscopic adjusters 48, 58, 78. For example, a video interface such as the high-definition multimedia interface (HDMI) can be used to allow the stereoscopic adjuster 48 in the disc video reproducing device 40 to communicate with the stereoscopic adjuster 78 in the 3D video display processor 71 through the selector 72 without requiring a separate adjuster-to-adjuster communication channel.

Third Embodiment

The third embodiment adds further types of stereoscopic adjustment to the scaling and shifting adjustments performed in the first embodiment. The adjustments performed in the first embodiment are illustrated in FIGS. 14A and 14B. The new adjustments are illustrated in FIGS. 14C and 14D.

FIG. 14A shows the adjustments illustrated in FIGS. 3A to 3D in the form of a graph with the unadjusted pixel position on the horizontal axis and the adjusted pixel position on the vertical axis. Both axes represent horizontal pixel position in terms of pixels on the display screen. The zero at the origin represents the left edge of the display screen and the value 1920 represents the right edge of the display screen. The adjustment shown shifts the left edge of the left-eye image (L screen) to the right by 192 pixel positions on the display screen. The right edge of the left-eye image remains at the right edge of the display screen. Similarly, the same adjustment shifts the right edge of the right-eye image (R screen) 192 pixel positions to the left, to pixel position 1728, while leaving the left edge of the right-eye image unchanged. The shifts are exaggerated in the drawings for clarity. This adjustment pulls the image toward the viewer.

FIG. 14B shows the adjustments illustrated in FIGS. 4A to 4D in the same way as in FIG. 14A. The adjustments applied to the left-eye and right-eye images are interchanged in FIG. 14B as compared with in FIG. 14A. The adjustment in FIG. 14B pushes the image away from the viewer.

FIG. 14C illustrates an adjustment that pulls only the central part of the image toward the viewer. The central part of the left-eye image moves toward the right, and the central part of the right-eye image moves toward the left. Whereas in FIGS. 14A and 14B the pixels are shifted by linearly increasing amounts, in FIG. 14C the pixels are shifted by amounts that first increase and then decrease. Because the changes are smooth, the displayed 3D image appears natural. The edges of the images for both eyes remain at the right and left edges of the screen, so the entire screen area is used for both images.

The adjustment in FIG. 14C ideally has a separate shift parameter for each pixel, but this would require a large amount of parameter information and in any case quantization error would preclude accurate parameter values, so in practice, the screen is divided into several horizontal segments and a constant parameter is specified for each segment, designating the amount by which the pixel shifts increase or decrease in that segment.

FIG. 14D illustrates an adjustment that mainly pushes the left and right edges of the image away from the viewer with only a slight change in the perceived depth of the central part. The left edge of the left-eye image remains at the left edge of the screen, but other parts of the image are shifted to the left by amounts that increase at an accelerating rate from left to right. Similarly, the right edge of the right-eye image remains at the right edge of the screen, but other parts of the right-eye image are shifted to the right by amounts that increase at an accelerating rate from right to left. In practice, the screen is divided into horizontal segments as in FIG. 14C, and the shifts increase at a constant rate in each segment.

In some parts of FIGS. 14C and 14D the lines indicating the shifts have a slope greater than unity. In these parts, the spacing between pixels is greater after the adjustment than before the adjustment and the scaling factor is greater than 100%.

Figure 15:
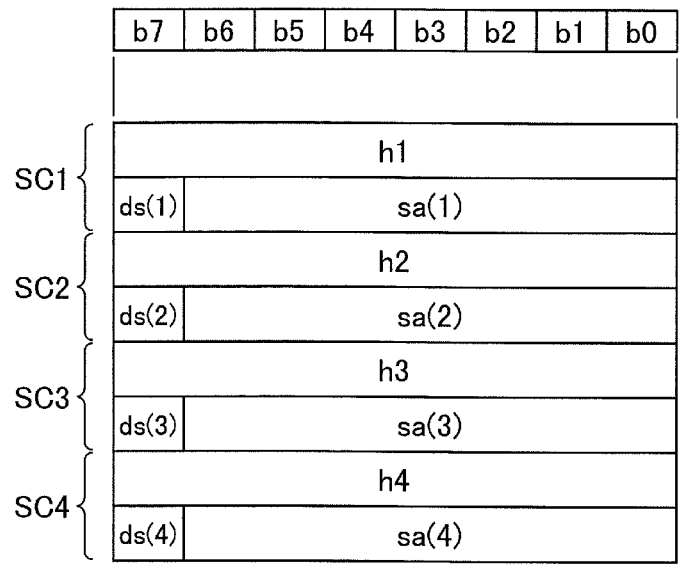
FIG. 15 illustrates a data format for parameters describing the novel stereoscopic adjustments in the third embodiment by giving different scaling factors and shift widths for different segments of the adjusted image.
Figure 16:
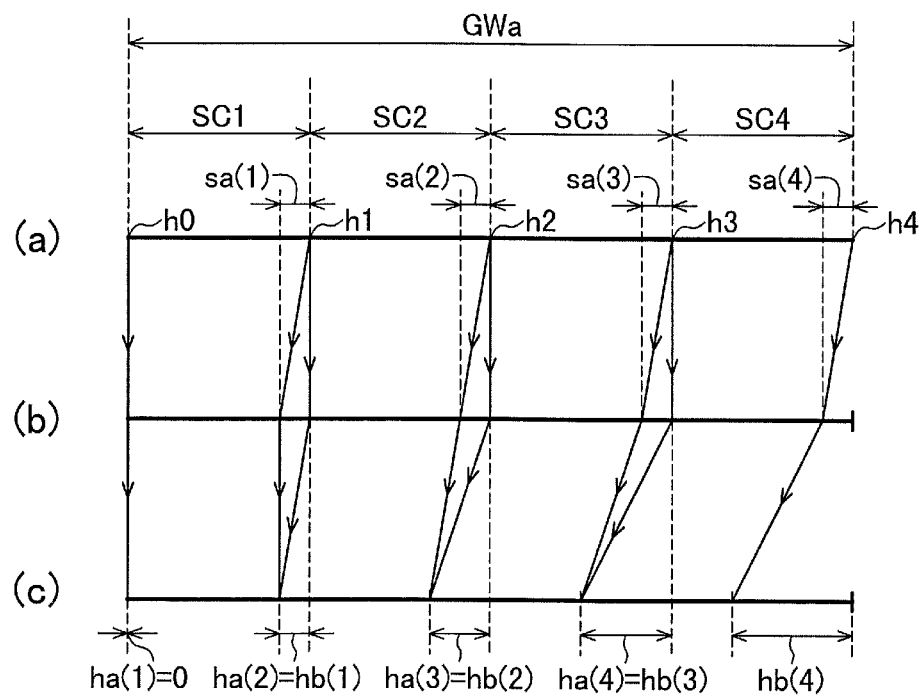
FIGS. 16 and 17 illustrate novel stereoscopic adjustments carried out according to the parameters in FIG. 15.
Figures 17, 18:
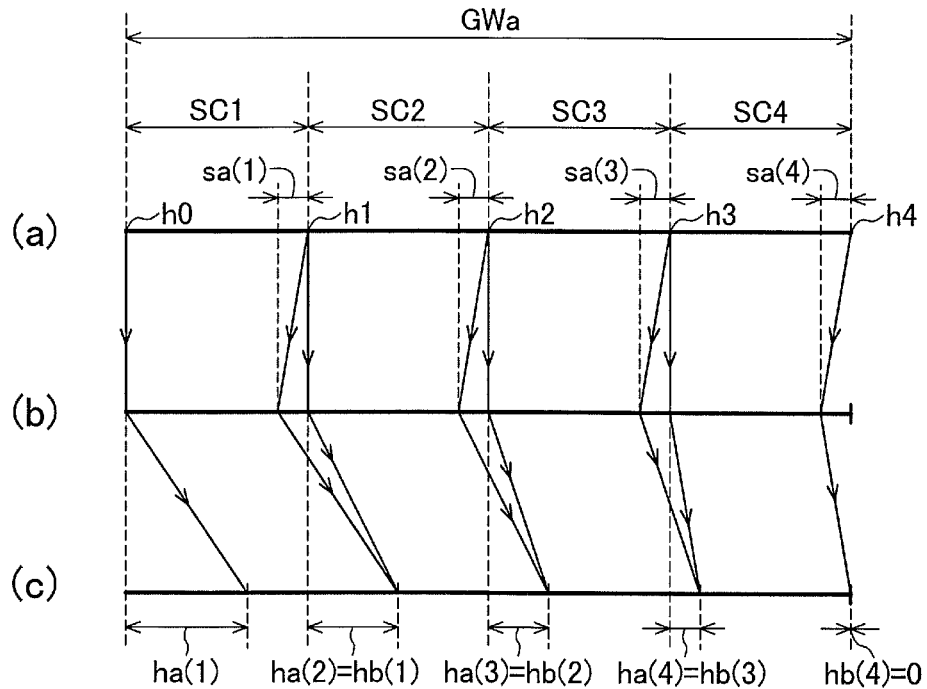
FIG. 18 illustrates a data format for parameters describing the novel stereoscopic adjustments in the third embodiment when all segments originally have the same width.

Parameter data for the adjustments for the case in which the image is divided into several segments, as for instance in FIGS. 16 and 17 are illustrated in FIG. 15. In general, the image is divided horizontally into N segments, where N is an integer; in FIG. 15 there are four segments SC1 to SC4. The parameters h1, h2, h3, h4 indicate the ending points of the segments (e.g., the right edges of the segments) before the stereoscopic adjustment. The adjustment performed in each segment is described in the same form as in FIG. 12, ds(1) and sa(1) specifying the adjustment in the first segment SC1, ds(2) and sa(2) the adjustment in the second segment SC2, and so on.

FIGS. 16 and 17 illustrate two adjustments specified in this way, using GWa to designate the entire width of the unadjusted image, e.g., the distance from LH0 to LH8 in FIG. 6A, or the distance from RH0 to RH8 in FIG. 6A, matching the distance between the two edges EL, ER of the display screen.

The first segment SC1 extends from zero (h0) to h1, the second segment SC2 extends from h1 to h2, the third segment extends from h2 to h3, and the fourth segment SC4 extends from h3 to h4. If the total width GWa is 1920 pixels, these parameters may have the following values, shown in decimal and hexadecimal notation (H).

h0=0=00H
h1=320=14H
h2=960=3CH
h3=1600=64H
h4=1920=78H

The parameters for each segment occupy two bytes, including one byte for the hexadecimal end-of-segment parameter hi and one byte specifying the ds(i) and sa(i) values (i=1 to 4). The sa(i) value indicates the amount by which one edge of the segment is shifted in relation to the other edge, i.e., the amount by which one edge, e.g., the right edge, is shifted when the other edge, e.g., the left edge, is fixed, and the ds(i) value indicates the direction of the shift. The shift width sa(i) therefore represents an absolute value of the change in the width of each segment.

The horizontal scaler 81 processes the i-th segment as described in the first embodiment, by holding one edge, e.g., the left edge, fixed and moving the other edge by the amount indicated by sa(i). The scaling factor β of a particular segment is the width of the segment after the adjustment divided by the width of the segment before the adjustment. The width before the adjustment is obtained by subtracting h(i−1) from hi. The width after the adjustment is obtained by adding or subtracting the sa(i) value. If the left edge is held fixed, then sa(i) is added if the ds(i) value indicates that the right edge is to be shifted to the right, and subtracted if the ds(i) value indicates that the right edge is to be shifted to the left.

The scaling operation is illustrated between lines (a) and (b) in FIGS. 16 and 17. The left edge of each segment is held fixed. The parts other than the left edge of each segment is shifted such that the distance from the left edge after the scaling is equal to the corresponding distance before the scaling multiplied by the scaling factor β for the segment. A per-pixel shift width pw(i) for the i-th segment can be calculated by dividing the sa(i) value, which indicates the movement of the right edge of the segment, by the number of pixels in the horizontal width of the segment. The direction of the shift can be taken into account by multiplying the per-pixel shift width pw(i) by the shift direction value ds(i), where ds(i) is treated as +1 for a right shift and −1 for a left shift, so that pw(i) (i.e., ds(i)×pw(i)) may be either positive or negative. The amount by which each pixel in the segment is shifted can be calculated by cumulative addition of these signed pw(i) values.

Within each segment, the direction of the shift is identical, so that, if the leftmost column of pixels in the i-th segment is regarded as the first column, then the amount sp(k, i) by which a pixel in the k-th column is shifted can be calculated as follows.

$$sp(k,i)=ds(i)\times pw(i)\times(k-1)$$

Following the scaling operation, the horizontal shifter 83 shifts each segment as necessary. In FIG. 16, for example, the horizontal shifter 83 leaves the scaled first segment SC1 as is and shifts the other segments to the left by progressively increasing amounts, to leave no space between adjacent segments (to eliminate the gap between adjacent segments that is created by the scaling). Since the horizontal scaler 81 leaves the left edge of each segment unchanged, the amount ha(i) by which the horizontal shifter 83 shifts the i-th segment is the amount by which the combined scaling and shifting adjustment moves the left edge of the i-th segment. For the first segment SC1, this amount ha(1) is zero. For the other segments SCi (i=2 to 4), ha(i) can be calculated as follows.

$$ha(i) = \sum_{j=1}^{i-1} ds(j)\times sa(j) \quad (1)$$

The amount hb(i) by which the adjustment moves the right edge of the i-th segment can be calculated as follows.

$$hb(i) = ha(i+1) = \sum_{j=1}^{i} ds(j)\times sa(j) \quad (2)$$

The stereoscopic adjustment in FIG. 16 thus shifts the left edge the i-th segment to the left by an amount ha(i) equal to the cumulative sum of the signed parameter values (ds(j)×sa(j)) of the segments (if any) to its left (j=1 to i−1), and shifts the right edge of the segment by an amount hb(i) equal to the cumulative sum of the signed parameter values (ds(j)×sa(j)) of the segments up to and including the i-th segment (j=1 to i).

The stereoscopic adjustment in FIG. 17, which leaves the right edge of the adjusted image aligned with the right edge of the screen, as in the left-eye image in FIG. 6B or the right-eye image in FIG. 6D, operates similarly except that cumulative addition is performed from the i-th segment to the rightmost segment. The left edge is shifted by an amount ha(i) equal to the sum of the signed parameter values of the segments from the i-th segment to the rightmost segment.

$$ha(i) = \sum_{j=i}^{4} ds(j)\times sa(j) \quad (3)$$

More generally, if there are N segments, the left edge of the i-th segment is shifted by:

$$ha(i) = \sum_{j=i}^{N} ds(j)\times sa(j) \quad (4)$$

The right edge of the i-th segment is shifted by an amount hb(i) equal to the sum of the signed parameter values of the segments (if any) to the right of the i-th segment.

$$hb(i) = ha(i+1) = \sum_{j=i+1}^{N} ds(j)\times sa(j) \quad (5)$$

In the general case, that is, the signed parameter values (ds(j)×sa(j)) are summed from the i-th segment to the rightmost segment (j=i to N) to obtain ha(i), and are summed over the segments to the right of the i-th segment (j=i+1 to N) to obtain hb(i).

In FIG. 15, the sa(i) values are stored in registers, the horizontal scaler 81 operates according to the stored values, and the horizontal shifter 83 operates according to values ha(i) calculated from the stored values. In an alternative scheme, the ha(i) or hb(i) values are stored and the horizontal scaler 81 operates according to sa(i) values calculated from the stored values.

In FIG. 16, the sa(i) value may be calculated from the left-edge shift values ha(i) as follows.

$$sa(i)=ha(i+1)-ha(i)$$

In FIG. 17, sa(i) is calculated as follows.

$$sa(i)=ha(i)-ha(i+1)$$

Alternatively, in FIG. 16, the sa(i) value may be calculated from the right-edge shift values hb(i) as follows.

$$sa(i)=hb(i)-hb(i-1)$$

In FIG. 17, sa(i) is calculated as follows.

$$sa(i)=hb(i-1)-hb(i)$$

In a variation of the third embodiment, all segments have the same width and instead of storing separate ending values h1, h2 . . . for each segment as in FIG. 15, only the number of segments N is stored as in FIG. 18. The value of N may be stored in hexadecimal form as a single data byte. A separate byte giving a shift direction ds(i) and magnitude sa(i) is stored for each segment (i=1, 2 . . . ).

If, for example, the width GWa of the unadjusted image is 1920 pixels and there are eight segments, as in FIG. 18, then the segment edges are located at the following positions h0 to h8, the first segment SC1 extending from h0 to h1, the second segment SC2 from h1 to h2, the third SC3 segment from h2 to h3, and so on, the eighth segment SC8 extending from h7 to h8.

$$h0 = 0$$
$$h1 = 240$$
$$h2 = 480$$
$$h3 = 720$$
$$\ldots$$
$$h7 = 1680$$
$$h8 = 1920$$

Using i to denote the i-th segment, $$hi=1920\times i/8$$

More generally, if there are N segments and the image width is GWa, $$hi=GWa\times i/N$$

In this variation as well, each segment has its own scaling factor β, equal to the width of the segment after the stereoscopic adjustment divided by the width of the segment before the stereoscopic adjustment. The width of the i-th segment SCi before the stereoscopic adjustment is obtained by dividing the unadjusted image width by N. The width after the adjustment is calculated from the width before the adjustment by adding or subtracting the shift value sa(i), depending on whether the shift direction ds(i) is to the right or to the left.

The horizontal scaler 81 and horizontal shifter 83 in this variation operate as described above with reference to FIGS. 15, 16, and 17. It is also possible to store the ha(i) or hb(i) values in registers and have the horizontal scaler 81 calculate the sa(i) values from the ha(i) or hb(i) values, instead of storing the sa(i) values as in FIG. 18.

Instead of giving explicit parameter values for each segment as in FIG. 15 or 18, it is possible to give just a small number of parameter values from which the specific values for each segment can be derived by a suitable approximation formula. The third embodiment can then be implemented more efficiently because there is less parameter data to be exchanged between the different stereoscopic adjusters that share the stereoscopic adjustment function.

As described above, the present invention provides a stereoscopic adjustment system in which the adjustment function is shared among different stereoscopic adjusters or different processing steps so that different adjustments can be produced for different types of content, different viewing environments, and different user's preferences without pushing any of the image data off the screen. In each of the preceding embodiments, all of the stereoscopic adjusters employ the same stereoscopic adjustment method, but embodiments in which different stereoscopic adjusters employ different stereoscopic adjustment methods, not necessarily limited to the scaling and shifting operations described above, are also within the scope of the invention, provided the different stereoscopic adjusters on each processing path from the data reproduction process to the display process operate in a coordinated manner.

It is also possible to employ the scaling and shifting stereoscopic correction in a system with only a single stereoscopic adjuster, to avoid the loss of data that occurs in the prior art.

Those skilled in the art will recognize that further variations are possible within the scope of the invention, which is defined in the appended claims.

What is claimed is:

1. A video display control method comprising the steps of:
reproducing, using a stereoscopic video content reproducing device, stereoscopic video content of a first type to obtain a first pair of images with mutual parallax;
performing, using the stereoscopic video content reproducing device, a first stereoscopic adjustment that modifies the first pair of images based on a first set of parameter values, thereby obtaining a second pair of images;
inputting the second pair of images to a stereoscopic video display device having a single screen;
performing, using the stereoscopic video display device, a second stereoscopic adjustment that modifies the second pair of images based on a second set of parameter values, thereby obtaining a third pair of images; and
displaying the third pair of images on the screen as images to respective eyes of a viewer, wherein
said second stereoscopic adjustment is performed in coordination with the first stereoscopic adjustment by transmitting the first set of parameter values to the stereoscopic video display device and transmitting the second set of parameter values to the stereoscopic video content reproducing device,
said first stereoscopic adjustment modifies the first pair of images by horizontal scaling of both of the first pair of images and horizontal shifting of at least one of the first pair of images to align a left edge of one of the resulting second pair of images with a left edge of the screen and align a right edge of the other one of the resulting second pair of images with a right edge of the screen using the first set of parameter values, and said second stereoscopic adjustment is different from the first stereoscopic adjustment and modifies the second pair of images by horizontal scaling of both of the second pair of images and horizontal shifting of at least one of the second pair of images to align a left edge of one of the resulting third pair of images with a left edge of the screen and align a right edge of the other one of the resulting third pair of images with a right edge of the screen using the second set of parameter values which are determined based on stored adjustment parameter values and the first set of parameter values received from the stereoscopic video content reproducing device.

2. The video display control method of claim 1, further comprising the steps of:

storing, in the stereoscopic video content reproducing device, the first set of parameter values for controlling the first stereoscopic adjustment; and storing, in the stereoscopic video display device, the second set of parameter values for controlling the second stereoscopic adjustment.

3. The video display control method of claim 2, wherein each of the first and second set of parameter values include at least one of information indicating a horizontal scaling factor and information indicating a horizontal shift width.

4. A video display control method for use in a video reproducing and displaying method comprising the steps of:

receiving parameter setting information from a first stereoscopic adjustment device;

receiving a pair of images with mutual parallax, that has been obtained by reproducing stereoscopic video content of a first type, and displaying the pair of different images with mutual parallax on a screen to respective eyes of a viewer;

said video display control method comprising:

modifying the pair of images based on a set of parameter values, said set of parameter values being based on stored parameter values for optimal viewing of the stereoscopic video content and the received parameter setting information from the first stereoscopic adjustment device, by horizontally scaling both of the pair of images based on the set of parameter values, and horizontally shifting at least one of the pair of images to align a left edge of one of the modified pair of images with a left edge of the screen and align a right edge of the other one of the modified pair of images with a right edge of the screen; and displaying the modified pair of images.

5. A video display control apparatus comprising:

a stereoscopic video content reproducing device for reproducing stereoscopic video content of a first type to obtain a first pair of images with mutual parallax, the stereoscopic video content reproducing device including a first stereoscopic adjuster for performing a first stereoscopic adjustment that modifies the first pair of images thereby obtaining a second pair of images; and a stereoscopic video display device for displaying a plurality of types of stereoscopic video content including the second pair of images, the stereoscopic video display device including a second stereoscopic adjuster that, operating in coordination with the first stereoscopic adjuster, performs a second stereoscopic adjustment that modifies the second pair of images, thereby obtaining a third pair of images, the stereoscopic video display device displaying the third pair of images on a screen to respective eyes of a viewer, wherein the first stereoscopic adjustment modifies the first pair of images by horizontal scaling of both of the first pair of images and horizontal shifting of at least one of the first pair of images to align a left edge of one of the resulting second pair of images with a left edge of the screen and align a right edge of the other one of the resulting second pair of images with a right edge of the screen based on a first set of parameter values determined based on stored parameter values for optimal viewing of the first type of stereoscopic video content and a second set of parameter values received from the stereoscopic video display device, and the second stereoscopic adjustment is different from the first stereoscopic adjustment and modifies the second pair of images by horizontal scaling of both of the second pair of images and horizontal shifting of at least one of the second pair of images to align a left edge of one of the resulting third pair of images with a left edge of the screen and align a right edge of the other one of the resulting third pair of images with a right edge of the screen using the second set of parameter values determined based on stored parameter values for optimal viewing of a second type, different from the first type, of stereoscopic video content.

6. The video display control apparatus of claim 5, wherein: each of the first stereoscopic adjuster and the second stereoscopic adjuster includes:

a storage unit for storing setting information for controlling the stereoscopic adjustment; and a communication unit for transmitting or receiving the setting information.

7. The video display control apparatus of claim 6, wherein: the first stereoscopic adjuster and the second stereoscopic adjuster transmit or receive the setting information by means of the communication unit.

8. The video display control apparatus of claim 6, wherein the each of the first and second set of parameter values includes at least one of information indicating a horizontal scaling factor and information indicating a horizontal shift width.

9. The video display control apparatus of claim 5, further comprising:

a broadcast video reproducing device, wherein:

the stereoscopic video display device receives a second type of stereoscopic video content reproduced by the broadcast video reproducing device and the first type of stereoscopic video content reproduced by the stereoscopic video content reproducing device, selects one of the first and second content, performs the second stereoscopic adjustment on the selected content, and displays the stereoscopically adjusted content;

the second stereoscopic adjustment is optimized for viewing of the second type content;

the first stereoscopic adjustment compensates for a difference between an optimal stereoscopic adjustment for the first type of content and an optimal stereoscopic adjustment for the second type of content.

10. The video display control apparatus of claim 9, wherein a change made in the settings for the stereoscopic adjustment in one of the first and second stereoscopic adjusters is accompanied by a compensatory change made in the settings for the stereoscopic adjustment in the other one of the first and second stereoscopic adjusters.

11. A video display control apparatus for use in a system in which a pair of images with mutual parallax are input from a stereoscopic video content reproducing device that reproduces stereoscopic video content of a first type, to a stereoscopic video display device with a screen, wherein the pair of different images with mutual parallax are displayed on the screen, so that the pair of different images with parallax are seen by respective eyes of a viewer, the video display control apparatus comprising:

a scaler that scales both of the pair of images in a horizontal direction based on a horizontal scaling factor;

a shifter that shifts at least one of the pair of images horizontally based on a horizontal shift width; and a communication unit for transmitting or receiving setting information for stereoscopic adjustment, wherein the horizontal scaling factor and the horizontal shift width are determined based on setting information stored in the stereoscopic video display device and setting information for a previously performed stereoscopic adjustment received from the stereoscopic video content reproducing device, and as a result of the scaling and shifting, a left edge of one of the pair of images is aligned with a left edge of the screen and a right edge of the other one of the pair of images is aligned with a right edge of the screen.

12. A stereoscopic video content reproducing device comprising:

a first stereoscopic adjuster that reproduces stereoscopic content of a first type and performs a first stereoscopic adjustment that modifies a first pair of images with mutual parallax according to a first set of parameter values thereby obtaining a second pair of images and outputs the second pair of images to a stereoscopic video display device; and a communication unit for transmitting the first set of parameter values to a stereoscopic video display device and receiving setting information from the stereoscopic video display device, the setting information corresponding to a second stereoscopic adjustment performed in the stereoscopic video display device for modifying the second pair of images to obtain a third pair of images, the second stereoscopic adjustment being different from the first stereoscopic adjustment, wherein the first stereoscopic adjuster performs the first stereoscopic adjustment for modifying the first pair of images, using a stereoscopic adjustment parameter communicated from the second stereoscopic adjuster in the setting information, or a parameter calculated based on a parameter included in the setting information received from the second stereoscopic adjuster of the stereoscopic video display device, to perform horizontal scaling of both of the first pair of images, and horizontal shifting of at least one of the first pair of images to align a left edge of one of the second pair of images with a left edge of a screen and align a right edge of the other one of the second pair of images with a right edge of the screen.

13. A stereoscopic video display device comprising:

a second stereoscopic adjuster that receives a second pair of images from a first stereoscopic adjuster of a stereoscopic video content reproducing device that reproduces stereoscopic content of a first type and performs a second stereoscopic adjustment for modifying the second pair of images thereby obtaining a third pair of images based on a second set of parameter values; and a communication unit for transmitting the second set of parameter values to the stereoscopic video content reproducing device and receiving setting information from the stereoscopic video content reproducing device, the setting information corresponding to the first stereoscopic adjustment performed in the stereoscopic video content reproducing device for modifying a first pair of images with mutual parallax to obtain the second pair of images; wherein the second stereoscopic adjuster performs the second stereoscopic adjustment for modifying the second pair of images, using a stereoscopic adjustment parameter communicated from the first stereoscopic adjuster in the setting information, or a parameter calculated based on a parameter included in the setting information received from the first stereoscopic adjuster of the stereoscopic video content reproducing device, to perform horizontal scaling of both of the second pair of images, and horizontal shifting of at least one of the second pair of images to align a left edge of one of the third pair of images with a left edge of a screen and align a right edge of the other one of the third pair of images with a right edge of the screen, the second stereoscopic adjustment being different from the first stereoscopic adjustment.

* * * * *